United States Patent [19]

Wilson

[11] 4,207,468
[45] Jun. 10, 1980

[54] OBJECT IDENTIFICATION SYSTEM

[75] Inventor: Stephen S. Wilson, Ann Arbor, Mich.

[73] Assignee: Kilo Corporation, Ann Arbor, Mich.

[21] Appl. No.: 903,808

[22] Filed: May 8, 1978

Related U.S. Application Data

[62] Division of Ser. No. 709,237, Jul. 27, 1976, Pat. No. 4,121,102.

[51] Int. Cl.² .............................................. G01J 1/00
[52] U.S. Cl. .................................... 250/341; 250/338
[58] Field of Search ............... 250/330, 338, 340, 341; 343/6.5 R, 6.5 LC, 6.5 SS, 6.8 R, 6.8 LC; 324/29.5; 340/505, 636, 660, 664

[56] References Cited

U.S. PATENT DOCUMENTS

| | | | |
|---|---|---|---|
| 3,806,872 | 4/1974 | Odom | 340/505 |
| 3,877,001 | 4/1975 | Bogut et al. | 340/636 |
| 3,934,188 | 1/1976 | York | 340/636 |
| 4,025,791 | 5/1977 | Lennington et al. | 250/341 |

Primary Examiner—Alfred E. Smith
Assistant Examiner—Janice A. Howell
Attorney, Agent, or Firm—Harness, Dickey & Pierce

[57] ABSTRACT

A transponder/interrogator system for remotely identifying objects. The interrogator emits infrared pulses to activate and remotely clock the transponder. Upon such activation, the transponder emits a unique code in the form of infrared pulses in accordance with a program stored in a recirculating shift register. The interrogator receives the infrared pulses from the transponder and decodes them. The decoded information is then supplied to a controller which runs various status checks on the object identified.

6 Claims, 19 Drawing Figures

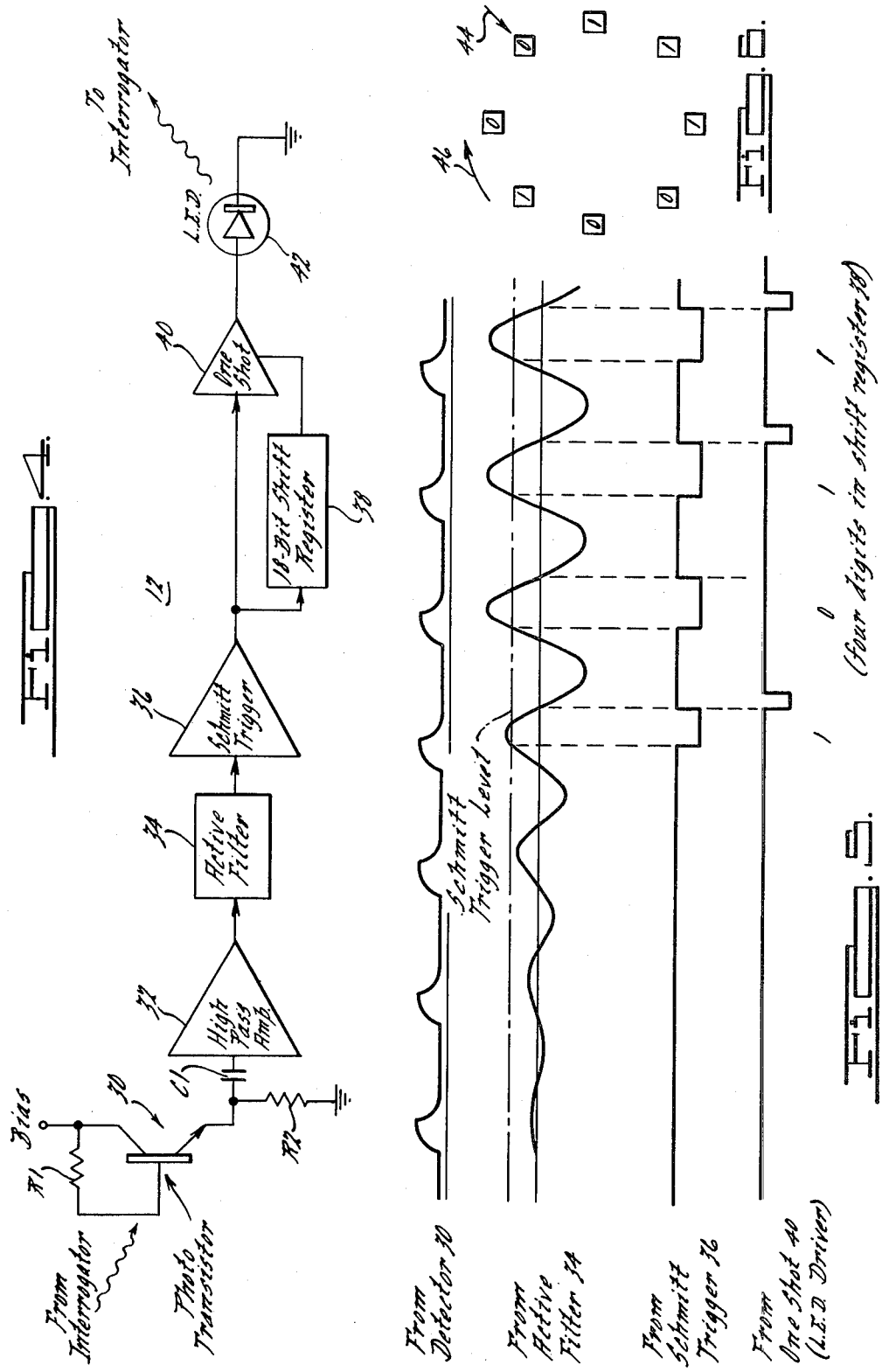

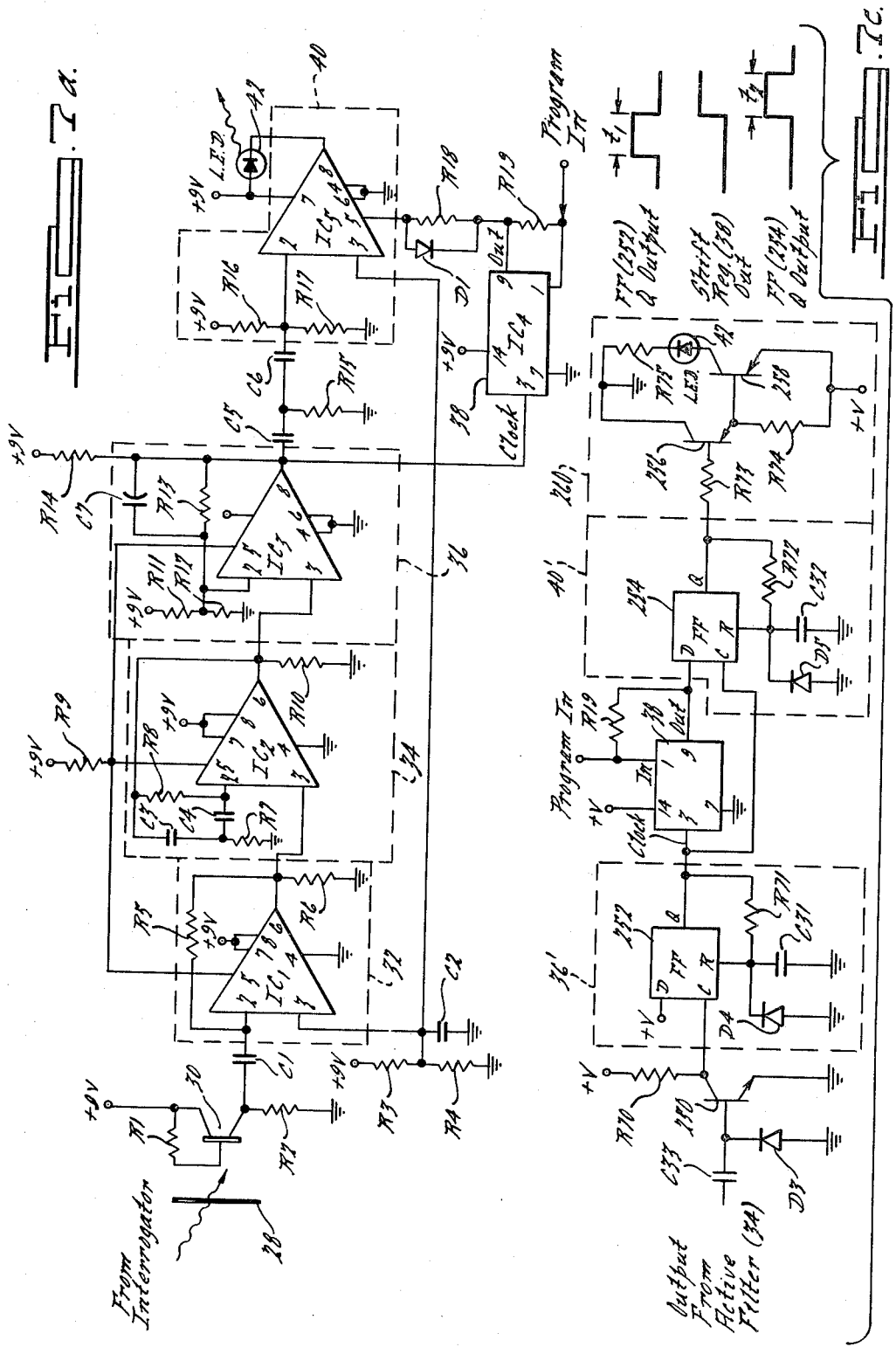

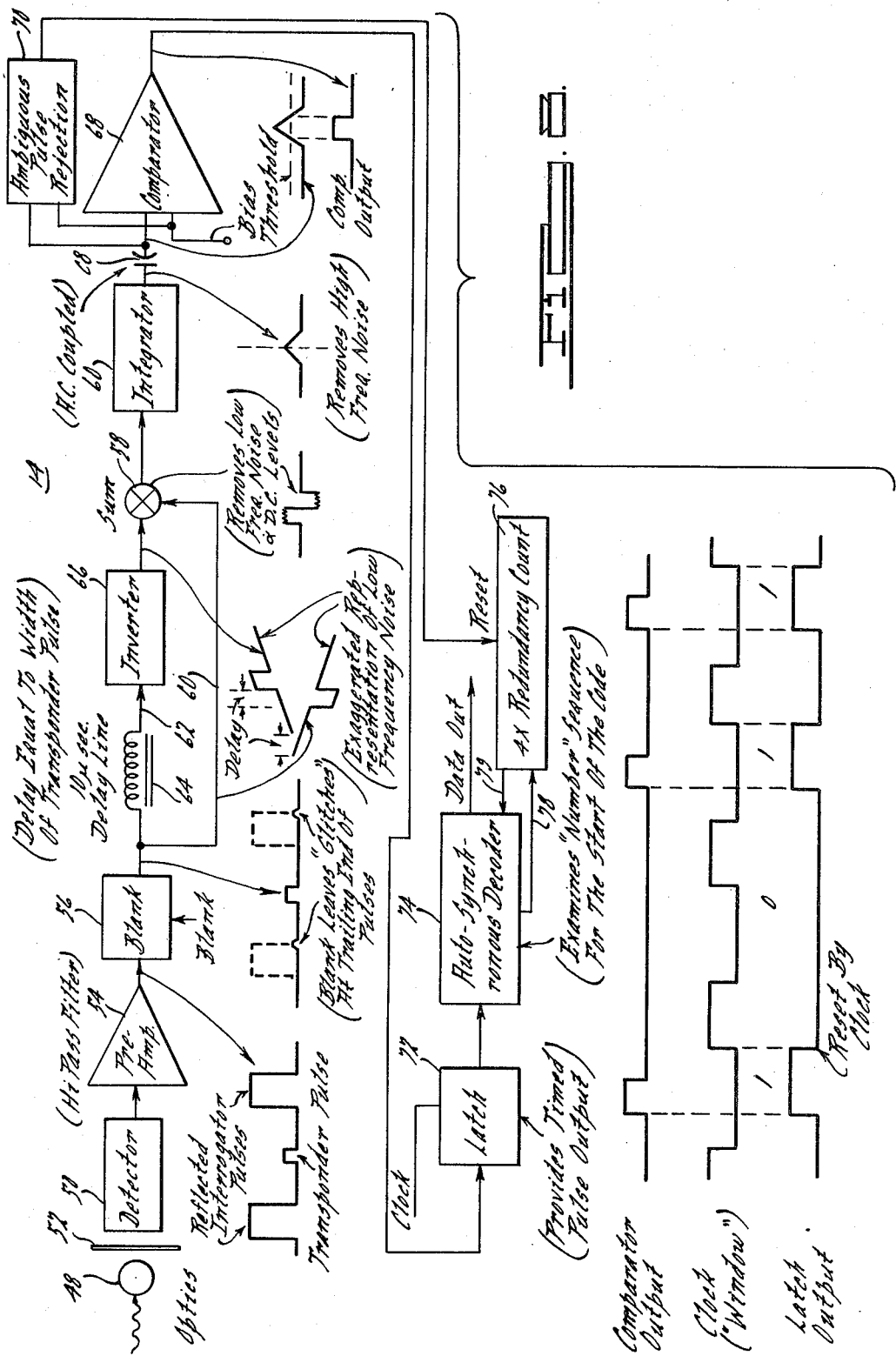

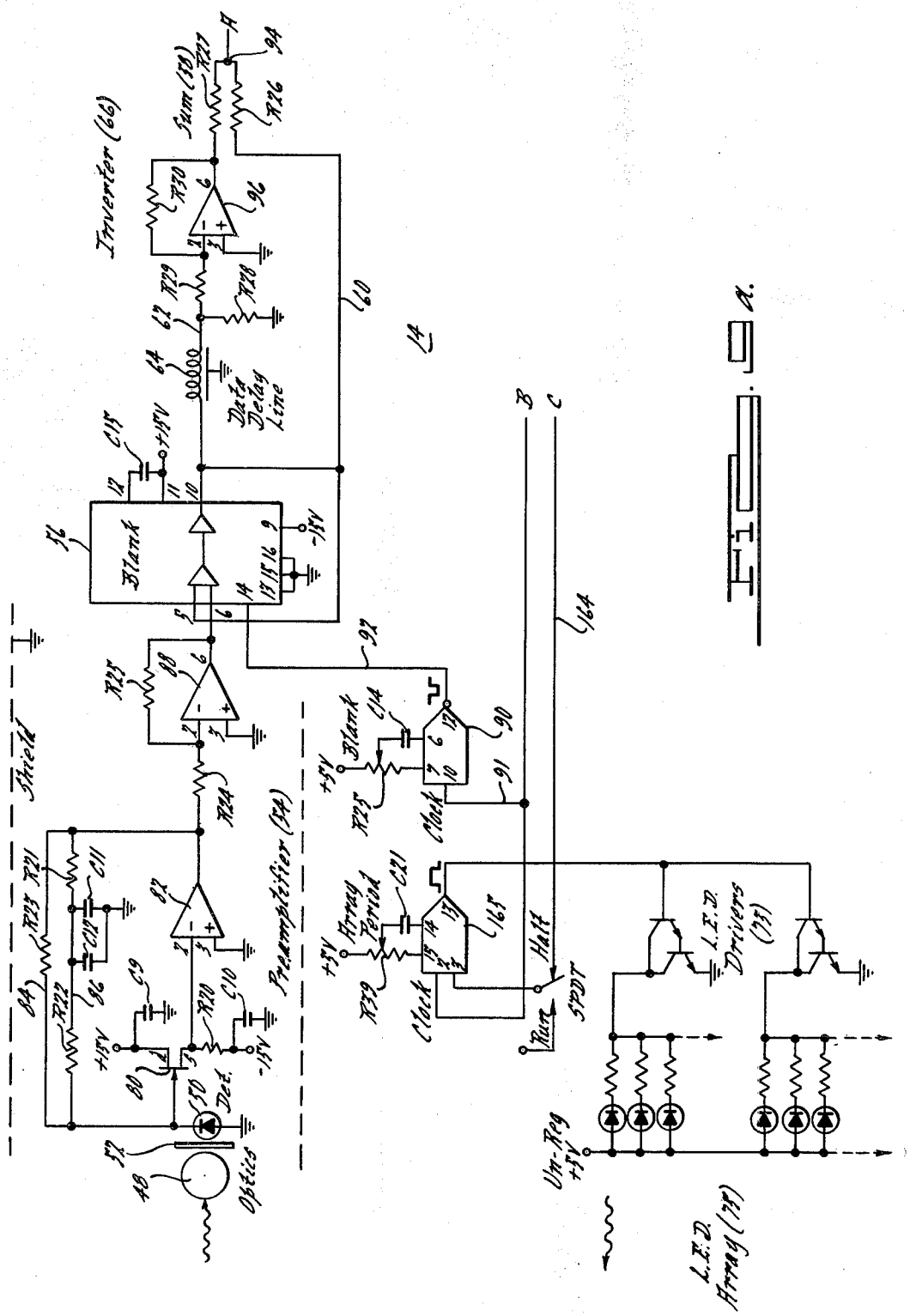

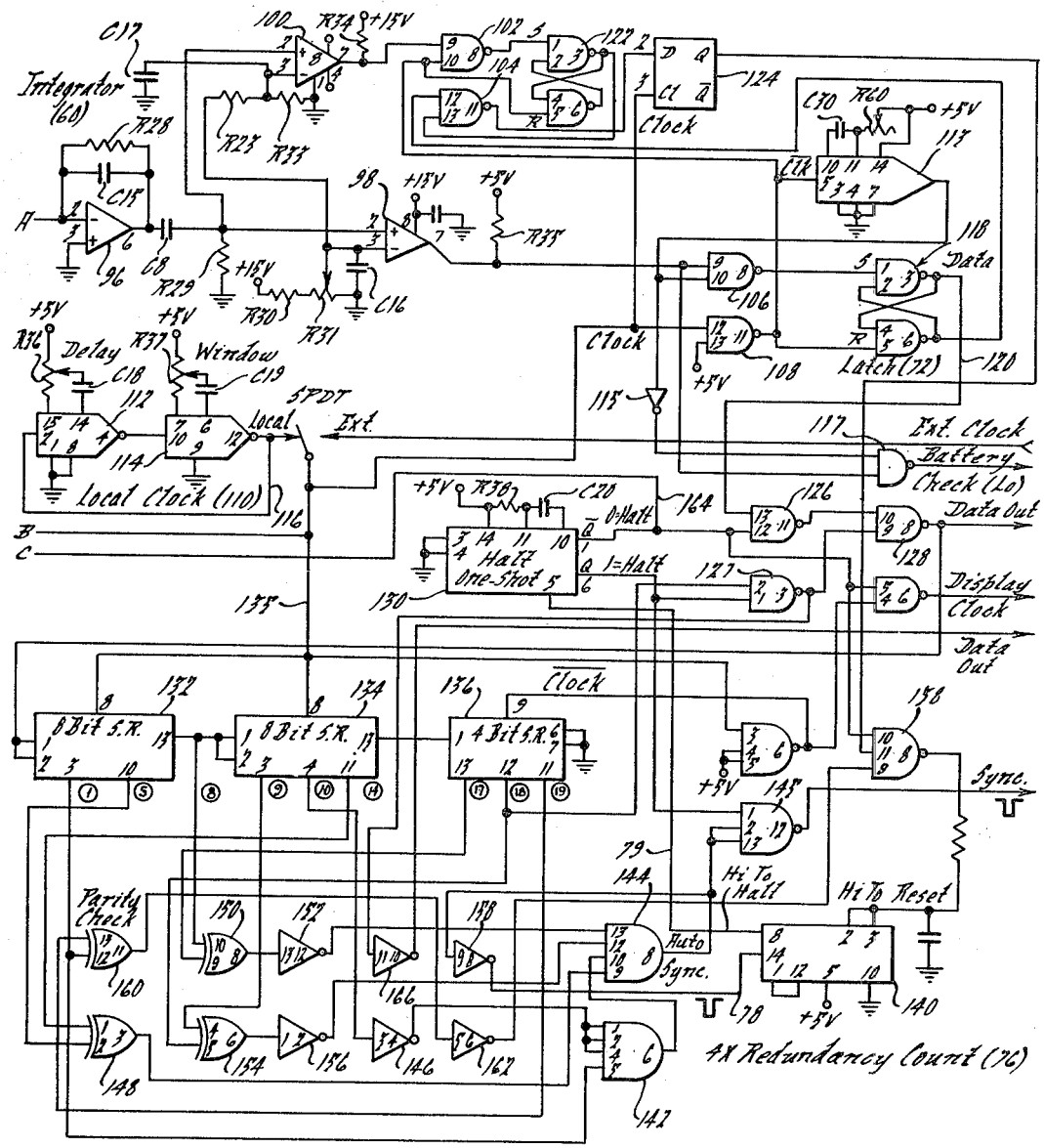

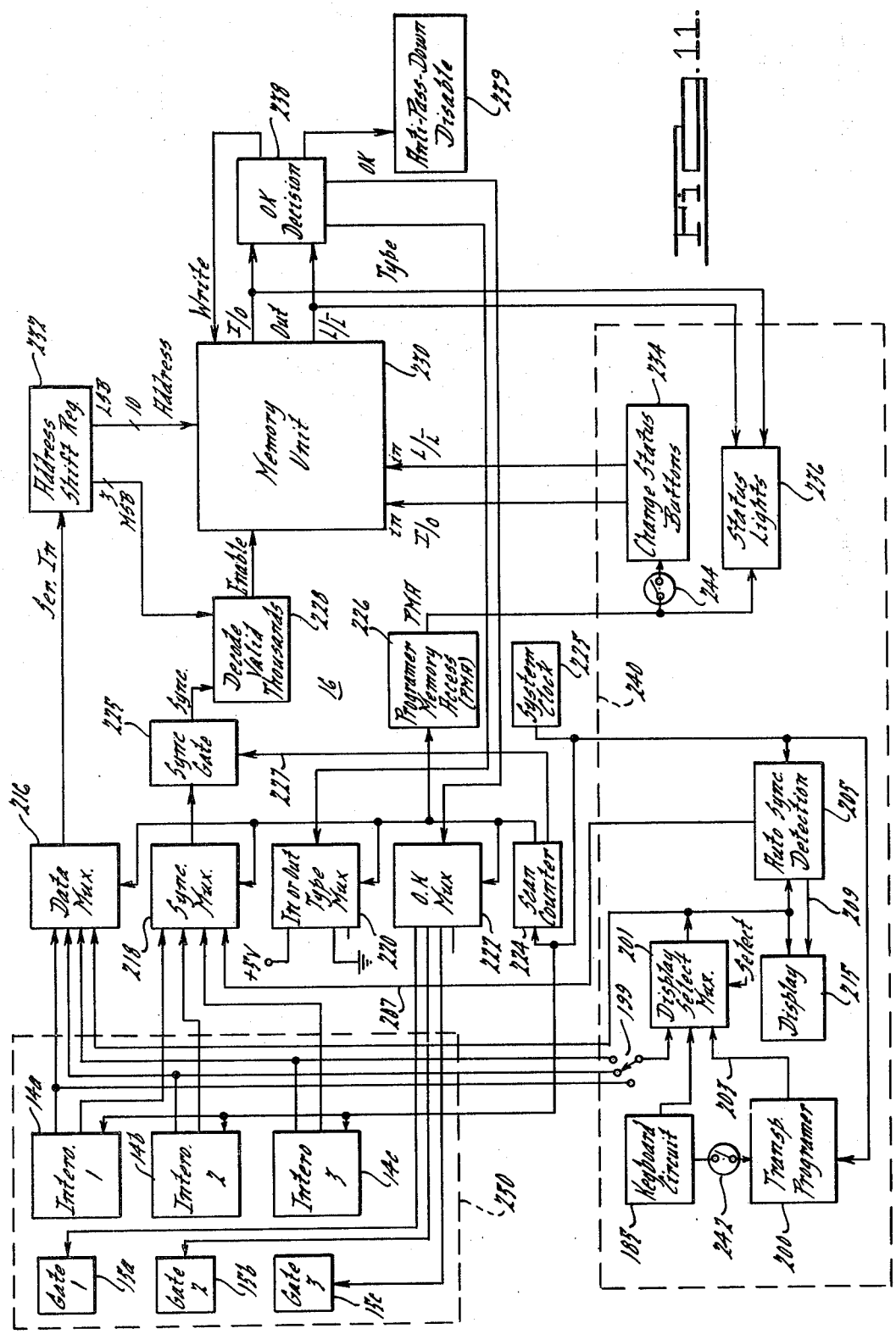

OBJECT IDENTIFICATION SYSTEM

This is a division of application Ser. No. 709,237, filed July 27, 1976 now U.S. Pat. No. 4,121,102.

BACKGROUND AND SUMMARY OF THE INVENTION

The present invention relates to a system for remotely identifying an object such as that disclosed and claimed in the application of Stanley R. Sternberg and John W. Lennington entitled "Remote Identification System", Ser. No. 603,927, filed Aug. 12, 1975, and assigned to the same assignee as the present application, the teachings thereof are incorporated herein by reference thereto. The remote identifying system of this invention is adapted to identify any object which may carry a transponder of the type disclosed herein in a position so that the transponder is in infrared light communication with an interrogator. One particularly useful application of the remote identifying system of this invention is to identify automobiles as they enter and depart a parking structure or the like so that their entry and departure may be recorded and their identification checked against a complication of authorized vehicles. Advantageously, the system of the present invention eliminates the necessity of stopping the vehicle to obtain a ticket or use another authorizing device such as a machinereadable card.

In the past, many systems have been suggested for remotely identifying objects. Generally, the systems can be classified into two general classes, (1) passive device systems, and (2) active device systems. The passive device systems may use labels or other structures on the object which may be read or which may cooperatively function with an interrogator to yield an identifying code. Generally, devices for reading labels such as pattern recognition systems are costly and complex, and as a result, do not lend themselves to many applications in which object identification without human assistance would be desirable. Passive device readers such as those using structures which are selectively resonant with ultrasonic vibrations or high frequency electromagnetic waves have the disadvantages of requiring an inventory of a large number of unique passive structures and very precise manufacture of the passive structures. There are further limitations relative to the number of unique codes which can be stored or transferred economically in the available time.

Active device object identification systems may be classified in the following catagories: (1) high frequency or radio frequency electromagnetic communicators, (2) light beam communicators, and (3) electromagnetic field communicators. The radio frequency devices have the disadvantage of requiring compliance with Federal Communications Systems' rules and the further disadvantage of susceptibility to radio frequency interference. This susceptibility requires the use of highly directional receiving and transmitting antennae. The magnetic field devices are difficult to implement due to the shielding of the steel bodies of automobiles and the existence of strong time-varying, interfering magnetic fields from generators and other devices which are associated with the automobile.

The object identification system of the present invention avoids many of the difficulties of the prior art identification systems through the use of unique optical and electronic structures and methods. The transponder of the object identification system of this invention can operate on its self-contained power source for one year without replenishment, requires no attention from the carrier of the transponder to emit its identifying code, is physically small, e.g., approximately the size of a cigarette pack, so that it may be carried by a large variety of small objects, and is capable of transmitting information rapidly enough so that, for example, an 18-bit binary number can be received several times by an interrogator at a fixed location as the object passes the location of the interrogator at speeds as high as 60 miles per hour, thusly providing redundant interrogation even at high transit speed.

As previously indicated, the remote identifying system of this invention is especially useful as a means for identifying vehicles as they enter or exit a parking facility. Presently, a number of different methods are in commercial use for identifying vehicles as they enter a parking facility. One such system is to provide each authorized vehicle with a sticker or other label which may be viewed by an attendant at the entrance of the parking facility. This method for identifying vehicles has the advantage that the driver is not required to stop the vehicle as it enters the parking facility but has the decided disadvantage of requiring the employ and constant attention of a parking attendant. The system is subject to human error and attendant inattention or dishonesty so that unauthorized vehicles or vehicles with expired leases may be allowed to enter. Another commercial system employs magnetic cards which the driver is required to insert into a slot in a card receptor at the entrance to the parking facility. The driver must stop his vehicle, thereby slowing the rate of entry of vehicles into the parking facility and inconveniencing the driver. The slow entry rate complicates the provision for traffic at the entry to the parking facility and often necessitates additional parking facility entrances to accommodate the slow entry rate. Accordingly, the cost of the parking facility is increased.

The object identifying system of the present invention, when used to identify vehicles entering a parking facility, has the substantial advantage of providing rapid and accurate identification of vehicles without requiring the employ of an attendant at each entrance or the stopping of each vehicle at the entrance. Accordingly, the vehicle may enter the parking facility at a relatively high rate of speed, e.g. up to 30 miles per hour. Furthermore, this system provides a high degree of user convenience. In addition, the digital code used by the system of this invention permits automatic parking control, computer accounting, billing, audit and vehicle inventory. For example, in the preferred embodiment, the digital code representing the vehicle entering the parking structure is provided to a controller for automatic comparison to a compilation in the memory thereof of authorized vehicles, time recording, and vehicle entry and departure recording so as to provide accurate and highly reliable control of the access of the parking facility vehicle inventory and accounting.

In its preferred form, the object identifying system according to the present invention includes a transponder which is carried by the object to be identified and an interrogator which may be in a fixed position and is in optical communication with the transponder. Preferably, the transponder and the interrogator are capable of detecting and emitting light pulses, e.g. pulses in the infrared band. The transponder is provided with a memory which stores a digital code which uniquely identifies the object carrying the transponder. In the preferred embodiment, the memory of the transponder is a recirculating shift register which is programmed with the digital code. The code employed is specifically designed to provide the optimum number of possible combinations for a given size "word", while maintaining the capability of distinguishing each unique word when transmitted in a recirculating bit stream. So as to avoid the necessity of an internal clock circuit in the transponder and to further avoid the complication of synchronizing the clock circuits of a transponder and an interrogator, the transponder is remotely clocked by the interrogator. This is accomplished by providing an interrogator which emits a sequence of light pulses at the clock frequency, as determined by a clock circuit located in the interrogator or an associated controller, which is received by the transponder, and by providing means in the transponder to convert these light pulses to electrical clock pulses. The electrical clock pulses are provided to the clock terminal of the recirculating shift register of the transponder. Thus, as the interrogator emits its light pulses, the recirculating shift register will sequentially provide the identifying code stored therein to its output terminal. The output terminal of the recirculating shift register of the transponder is connected to the circuitry which activates an infrared emitting device so as to transmit the code to the interrogator. In the preferred embodiment, the transponder introduces a delay between the receipt of the interrogating pulses and the emission of a correlative transponder pulse so that the transponder pulses may be temporarily distinguished from reflected interrogating pulses. The remote clocking also provides an advantageous way of determining when pulses are validly received from a transponder and distinguishing those pulses from received extraneous infrared signals. Additionally, the remote clocking is used to closely monitor the amount of delay time introduced by the transponder, which permits the interrogator to determine whether the battery in the transponder is in need of replacement.

Other novel and advantageous features are found in the object identification system of the present invention as will be apparent in view of the detailed description of the preferred embodiment.

BRIEF DESCRIPTION OF THE DRAWINGS

FIG. 4 is a block diagram of the transponder of the present invention;

FIG. 5 is a signal diagram illustrating various signals present in the transponder of FIG. 4;

FIG. 6 is illustrative of the position of the binary code in the recirculating shift register of the transponder of FIG. 4;

FIG. 7a is a circuit diagram of one embodiment of the transponder of the present invention;

FIG. 7c is a circuit diagram of another embodiment of the transponder of the present invention;

FIG. 8 is a block diagram of the interrogator of the present invention;

FIGS. 9a and 9b are the circuit diagram of the interrogator shown in FIG. 8;

FIG. 9c is a circuit diagram of an alternative preamplifier design for the interrogator illustrated in FIG. 9a;

FIG. 11 is a general block diagram of the controller of the present invention;

FIG. 11a is a more detailed block diagram of a section of the controller illustrated in FIG. 11;

FIG. 12 is a circuit diagram of the transponder programmer illustrated in FIG. 11a.

DETAILED DESCRIPTION OF THE PREFERRED EMBODIMENT

Figure 1:
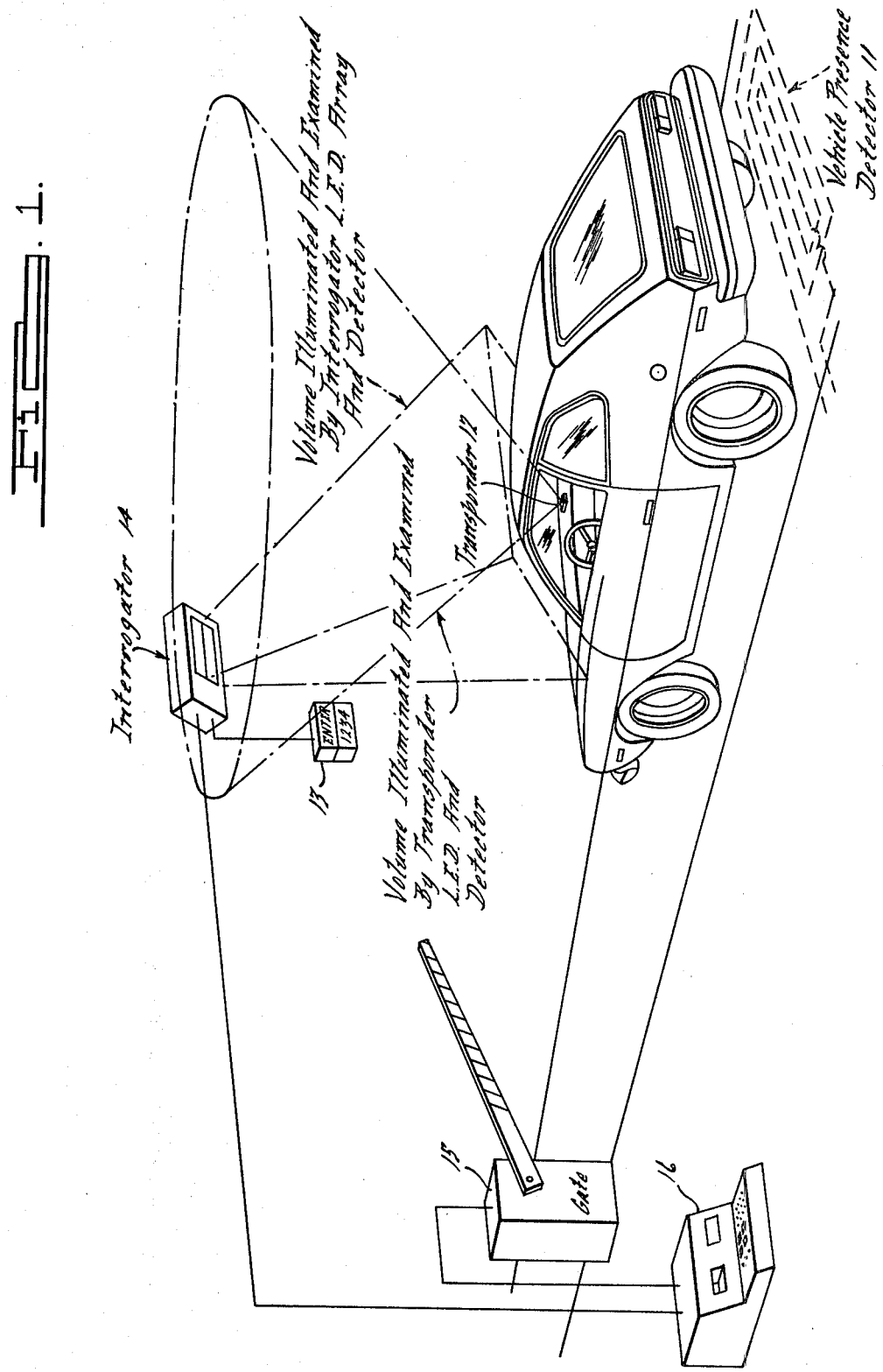
FIG. 1 is a view of an object identification system according to the present invention which in the exemplary application of FIG. 1 is used to identify vehicles as they enter and exit a parking facility.

In FIG. 1, the object identification system 10 of this invention is illustrated in an exemplary application for identifying vehicles entering a parking facility. The system 10 includes a transponder 12 which is preferably located on the dashboard of the vehicle and an interrogator 14 which is located in a fixed position above the entry lane of the parking facility. The transponder 12 and the interrogator 14 are in mutual optical communication. The interrogator 14 may be operated on a continuous basis so as to detect and identify any transponder 12 within its field of view or may be activated using any conventional vehicle presence detector as illustrated at 11. Note that the interrogator 14 and the transponder 12 have overlapping fields of transmission/reception with the field of transmission/reception of the transponder being indicated by the interrupted lines showing a conical volume and the field of transmission/reception of the interrogator being indicated by the interrupted lines showing a trapezoidal volume. When the interrogator 14 communicates with an authorized transponder 12, the gate 17 to the parking facility is opened.

Figure 2:
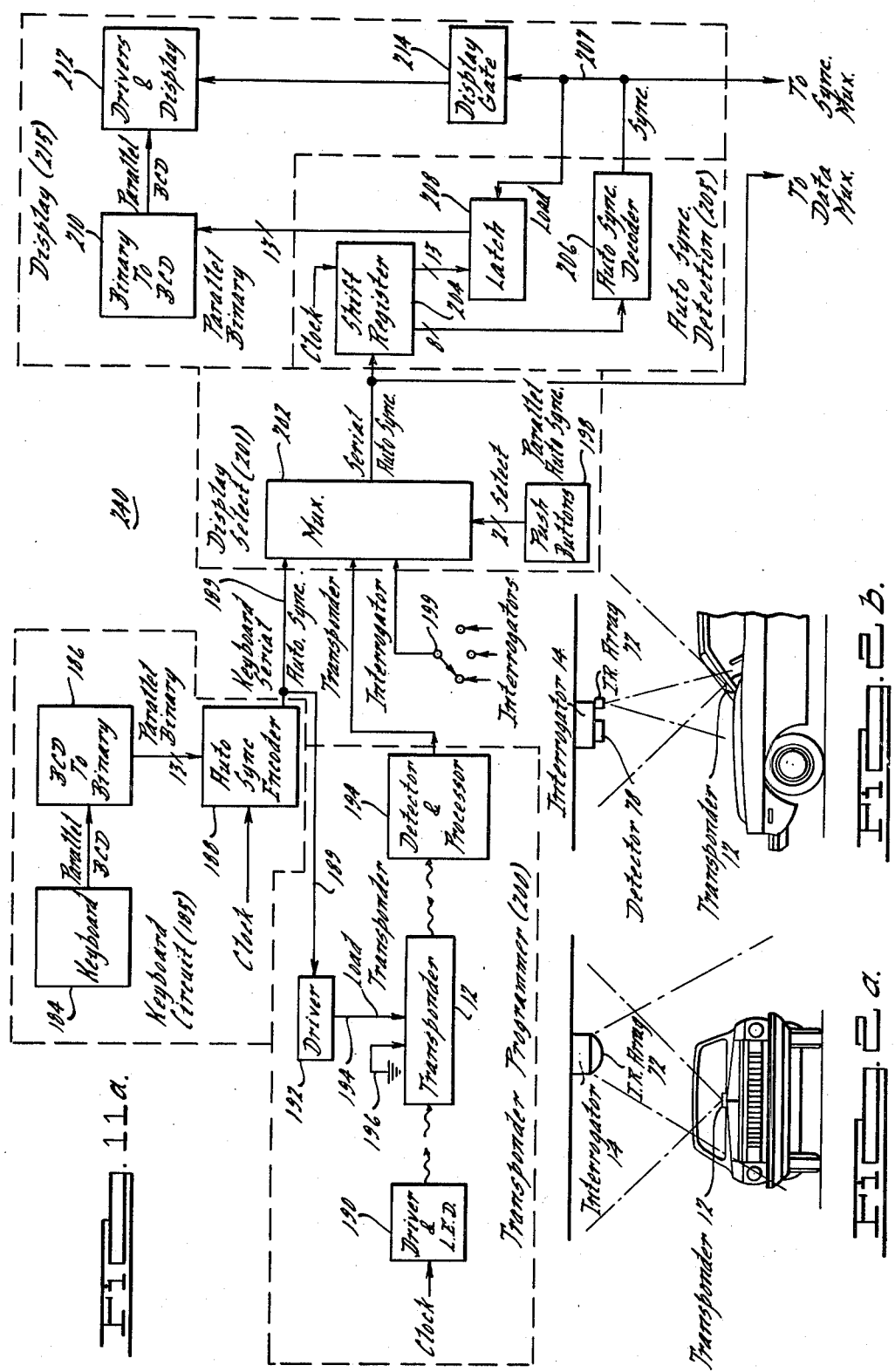
FIGS. 2a and 2b are further views of the transponder, as it is positioned on the upper surface of the dashboard of a vehicle, and the interrogator shown in FIG. 1.

In FIGS. 2a and 2b, the relative positions of the transponder 12 relative to the interrogator 14 is illustrated in frontal and side views of the vehicle. In those figures, the overlapping nature of the fields of transmission/reception of the transponder 12 and interrogator 14 can be readily seen.

Figure 3:
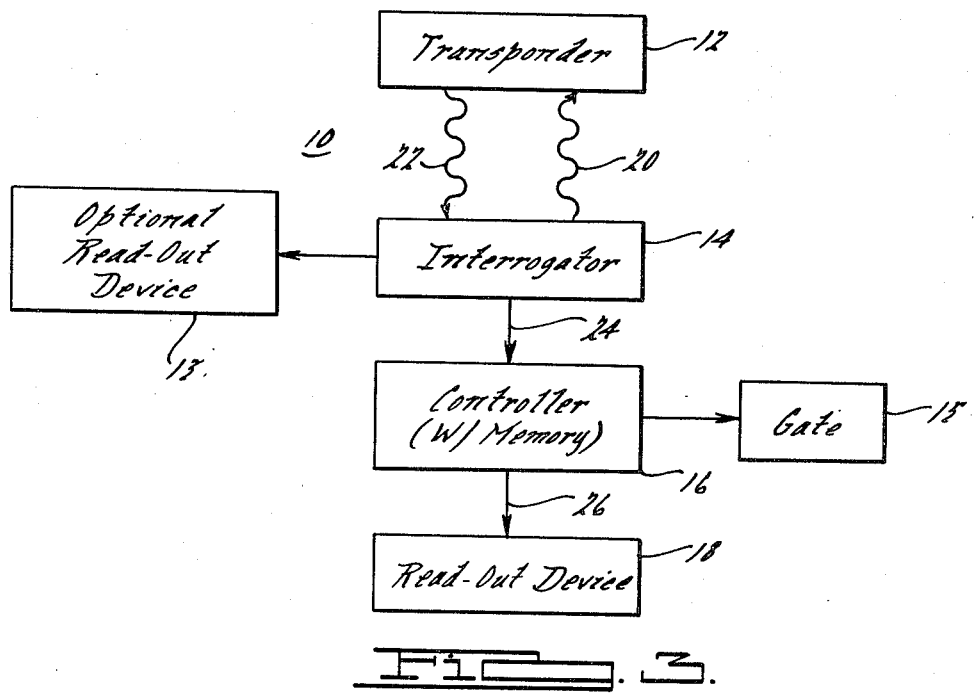
FIG. 3 is a general block diagram of the object identification system according to the present invention.

In FIG. 3, a block diagram of the object identification system 10 according to the present invention is illustrated. The system 10 is seen to comprise the transponder 12, the interrogator 14, an optional read-out device 13, the controller 16 which controls the gate 15, and the read-out device 18, as shown in FIG. 1. The transponder 12 is normally in a receive only mode and is activated to a transmit mode upon the receipt of infrared light pulses, shown illustratively at 20. The transponder 12 is adapted to sequentially emit a coded set of pulses, for example, a repeated word comprising 18 binary bits, along the light path shown illustratively at 22. The interrogator 14 continuously provides interrogating pulses shown illustrative at 20 and receives the transponder pulses 22 when a transponder 12 is within the field of interrogation of the interrogator 14. The interrogator decodes the transponder information and provides a signal on line 24 to the controller 16 which is representative of the encoded number transmitted by the transponder 12. Additionally, the decoded information may be optically displayed on a read-out device 13.

The controller 16, in turn, compares the encoded number with a compilation of authorized numbers stored in its memory and provides the appropriate output signal on line 26 to the read-out device 18 which visually indicates the present status of the vehicle or other object identified. In addition, if the controller determines that the identified vehicle is authorized to enter the facility, the controller 16 will automatically open the gate 15 and permit the vehicle to enter.

Preferably, the interrogator is provided with a suitable optical or LED array dispersal system so that the light pulses transmitted by the interrogator 14 will be confined to a predetermined area through which objects carrying the transponder 12 will pass. In the example of FIG. 1, this area is the entry lane of a parking facility just prior to the entry gate 15 which is operable to admit the vehicle into the parking structure. In the preferred embodiment, the interrogator 14 is equipped with an optical dispersal system comprised of a cylindrical Fresnel type lense disposed with its axis transverse to the entry lane of the parking facility. The resulting interrogation field is approximately as depicted in FIG. 1. Specifically, the field of view is limited in the vertical direction and very wide in the horizontal direction. In this manner, the entire width of the entry lane is monitored, which is important since every vehicle will not proceed along the center of the entry lane and the transponders 12 in the vehicles will invariably be mounted at different locations on the dashboards. In addition, the interrogator 14 is set at an angle of approximately 45° off the vertical, as shown, so that the interrogator pulses are less apt to reflect off the windshield of an approaching vehicle; a situation which could occur if the angle at which the infrared light strikes the windshield is shallow enough.

The interrogator optical systems should be further adapted to receive returning infrared pulses from this same area. Therefore, the highly directive nature of the optics of the interrogator 14 can provide a convenient, and highly accurate, means of receiving responses of a transponder 12 located within a selected illuminated/detected volume. Thus, the detector 50 is equipped with a cylindrically shaped lense that provides approximately the field of view as the cylindrical Fresnel type dispersal lense.

The interrogator 14 repeatedly emits infrared pulses at a constant frequency which are received by the transponder 12 within the interrogation volume. In response to those interrogator pulses, the transponder 12 emits pulses representative of its code. The code is in binary form so that following receipt of each pulse along path 20, the transponder 12 will emit a pulse to represent a binary "1" or will not emit a pulse to represent a binary "0". The interrogator 14 is adapted to receive a transponder pulse after the elapse of a predetermined time period subsequent to the emission of its own pulse so that it can distinguish between binary "1's" and binary "0's". The pulsing process is repeated at a high repition rate, e.g. 7KHz.

Although the code stored in the transponder 12 has a logic starting point and a logic ending point, the code transmitted to the interrogator 14 may be started at any point including points intermediate the logic starting point and the logic ending point. However, since the code is repeated a number of times during a single interrogation of the transponder 12 by the interrogator 14, and the code stored in the transponder 12 is selected so that the logic starting point can be identified, any random starting operation point can be accommodated.

In FIG. 4, a block diagram illustrating of a transponder 12 according to the present invention. The transponder 12 is characterized by extremely low power consumption and commendably low manufacturing cost as will be appreciated by those skilled in this art in view of the following description thereof. More specifically, the transponder 12 may operate for up to 12 months on one standard nine-volt transistor radio battery. The quiescent power consumption is from 0.45–0.72 milliwatts with a quiescent current drain from the battery of from 50–80 microamps. The transponder 12 includes a detector 30 which consists preferably of a phototransistor 30. A phototransistor has been selected over the more sensitive, and therefore seemingly preferable, photodiode because of cost. The phototransistor 30 has its collector connected to a 9-volt bias potential, its base connected to the bias potential through a biasing resistor R-1, and its emitter connected to ground potential through a load resistor R-2. The emitter is also connected to the positive input of a high pass amplifier 32 through a coupling capacitor C-1, which effectively excludes sunlight and 60-cycle hum produced by 60-cycle light sources. The high pass amplifier 32 compensates or the low security of the phototransistor a restored signal at its output.

The output of the high pass amplifier 32 is received by a high Q active filter 34, which is tuned to the fundamental frequency of the interrogator pulses. The tuned resonant band pass characteristic of the active filter 34 effectively distinguishes interrogator pulses from other extraneous infrared pulses and electronic noise in a manner to be described. The active filter 34 provides its output to a Schmitt trigger 36 which produces a square wave output that is initiated when the output of the active filter 34 exceeds a pre-selected threshold, and is terminated when the output from the active filter 34 falls below zero. Accordingly, the output of the Schmitt trigger 36 is a series of square wave pulses suitable for operating conventional integrated circuit logic.

The output of the Schmitt trigger 36 is provided to the clock input of an 18 bit shift register 38 and a one-shot multivibrator 40. The recirculating shift register 38 provides output pulses to an enabling input of the one-shot multivibrator 40 in accordance with the binary code stored in the recirculating shift register 38. More particularly, the recirculating shift register 38 is programmed such that it will yield a pulse when there is a logic "1" in the next position in the register and will not yield a pulse if there is a logic "0" in the next position in the register. Both the recirculating shift register 38 and the one-shot multivibrator 40 are responsive to the trailing edge of the pulse from the Schmitt trigger 36, so that the response of the recirculating shift register 38 and the one-shot multivibrator 40 are delayed by the duration of the pulse from the Schmitt trigger 36 relative to the receipt of an interrogator pulse at the phototransistor 30. The pulses from the one-shot multivibrator 40 are provided to a light-emitting diode (LED) 42 which is in light communication with the interrogator 14, so that the interrogator 14 will receive the output pulses of the transponder 12 transmitted by the LED 42.

With reference now to FIG. 5, the operation of the transponder 12 will be explained. In FIG. 5, the output pulses from the detector 30 are illustrated as modified square wave pulses of constant frequency. The second line illustrates the output signal from the active filter 34 which results from the amplified output signal from the detector 30. Note that the output signal from the active filter 34 initially has a low amplitude which slowly builds as energy is repetitively provided at its tuned frequency to the input of the active filter 34. This is due to the band pass resonant characteristic of the active filter 34 which allows the resonant buildup of pulse amplitude as pulses at the resonant band pass frequency are received at the input of the active filter 34. Upon receipt of a sufficient number of pulses at the resonant band pass frequency, the active filter 34 attains in amplitude sufficient to activate the Schmitt trigger 36. In the following line, the output signal of the Schmitt trigger 36 is shown. As can be seen, the square wave pulses are initiated upon the fourth received interrogator pulse. In the fourth line of FIG. 5, the output from the one-shot multivibrator 40 is illustrated as a series of square wave pulses initiated upon the trailing edge of the output from the Schmitt trigger 36. Note that the output pulses from the one-shot multivibrator 40 are delayed relative to the initiation of the output pulses from the detector 30 by the duration of the positive pulses from the Schmitt trigger 36. Since the pulses from the Schmitt trigger 36 are in part dependent upon the amplitude of the signal from the active filter 34, this period of delay may vary somewhat, but does not vary sufficiently to affect the operation of the system 10. This delay is selected so that the pulses from the one-shot 40, which result in output pulses emitted from the LED 42, occur intermediate the output pulses from the interrogator 14.

With reference now to FIG. 6, the general manner of operation of the recirculating shift register 38 will be explained. The binary code contained within the recirculating shift register 38 can be considered as having its bits arranged in the form of a circle as illustrated in FIG. 5. An arrow 44 indicates the random starting point location for circulation of the pulses through the recirculating shift register 38. Note that the arrow is located at a shift register position having a binary "0". When an interrogator pulse is received by the transponder 12, the arrow is shifted to the next box in clockwise order as indicated by the arrow 46. If this next box contains a binary "1", as illustrated, the recirculating shift register 38 will provide an output to the one-shot multivibrator 40, which, in turn, results in an output pulse from the transponder 12. Each time the recirculating shift register 38 is indexed to the next position, the transponder 12 will either provide an output pulse if the position has a binary "1" or no output pulse if the position has a binary "0". The initial position of the pulses in the shift register prior to the receipt of an interrogator pulse is not preset. The starting point, e.g. the position of the arrow 44, may be at any location in the shift register. As the transponder 12 receives pulses from the interrogator 14, the position of the pulses will shift around the circle. The structure of the binary number, however, will be formulated so that the beginning and end of the binary number can be determined by appropriate logic, as will be described.

In FIG. 7a, a schematic diagram of the transponder 12 is shown. The factors which dictated the design of the transponder circuit are: (1) low power or long battery operation, (2) low cost, (3) high speed, and (4) small size. As previously mentioned, the cost consideration made it more desirable to use a phototransistor 30 rather than a more sensitive and more expensive photodiode. However, the use of a phototransistor requires the addition of a high pass amplifier 32 whose high gain compensates for the lack of sensitivity of the phototransistor 30. Additionally, active filter 34 is preferably a high Q filter so that the higher noise levels of the phototransistor 30 will be filtered out.

The transponder 12 is also equipped with an optical filter 28 that is positioned over phototransistor 30 to restrict the light energy received by phototransistor 30 to the infrared band. The phototransistor 30 requires separate biasing, which is provided by resistors R1 and R2, tied to the base and emitter, respectively, of the phototransistor 30. The collector of the phototransistor 30 is connected to a bias voltage of +9 volts. The values of R1 and R2 are selected so that the phototransistor 30 is biased to a linear region. Resistor R2 is selected to have a value low enough so that phototransistor 30 will not saturate during high ambient light levels, but not so low as to permit excessive battery drain. In this manner, the voltage at the emitter of the phototransistor 30 will directly depend on the amplitude of the incident light.

The emitter is also connected, through coupling capacitor C1, to the negative input (pin 2) of the high pass amplifier 32. The a.c. coupling provided by C1 blocks low frequency noise and excludes constant light sources, such as sunlight. The positive input (pin 2) of the high pass amplifier 32 is connected to a voltage divider network consisting of series resistors R3 and R4 and capacitor C2. This network provides a d.c. bias level of four volts to the positive input of the high pass amplifier to accommodate the a.c. signal which swings from 0 to 9 volts.

The four operational amplifiers used in the transponder 12 are all transconductance amplifiers in which the output current is proportional to the differential input voltage. A suitable operational amplifier of this type is manufactured by RCA mfg. #CA 3094. The current through the programmable input (pin 5) of these amplifiers controls their sensitivity, slew rate, and power supply current. A very low program current (e.g. 3 micro-amp) is used on all four of the amplifiers to achieve low battery power consumption. This is determined by the value of resistor R9 which controls the operating power of the first three stages.

The output from amplifier 32 (pin 6) is returned to its negative input (pin 2) through feedback resistor R5, to prevent saturation of the amplifier 32. The output from pin 6 is also connected to ground potential through pull-down resistor R6 and to the positive input (pin 3) of the active filter 34. The active filter 34 is placed in the second stage of the circuit rather than in the first stage to avoid the continuously changing input resistance of the phototransistor 30 which would lead to instability in the active filter 34.

The output from the active filter 34 (pin 6) is returned to its negative input (pin 2) through a multiple feedback network composed of capacitors C3 and C4 and resistors R7 and R8. The feedback network serves to tune the active filter 34 to the frequency of the interrogator pulses. Thus, as the filter 34 begins to oscillate in response to the initial pulses received from the interrogator 14, successive pulses reinforce the preceeding oscillations of the filter 34 until the magnitude of the output signal from the filter 34 is sufficient to activate the Schmitt trigger 36, as is graphically illustrated in the waveforms shown in FIG. 5. In this manner, it can be seen that the present transponder system avoids a general problem which plagues other transponder systems. And that is the problem of having the transponder output signals picked up by the input detector 30, thereby causing false triggering or instability. In the present system, the combination of the external interrogator pulses and the transponder return pulses can give rise to an overall frequency twice that of the interrogator pulses alone, and therefore, twice the frequency at which the active filter 34 is tuned. Thus, such signals are effectively ignored by the active filter 34 since pulse received at frequencies other than the tuned frequency will not produce the reinforcing oscillations in the active filter 34 required to activate the Schmitt trigger 36.

The output from the active filter 34 (pin 6) is connected to ground potential through pull-down resistor R10 and to the negative input (pin 3) of the Schmitt trigger 36. It should be noted that the signal at the inputs to the first and third stages of the transponder circuit are inverted. The reason for this is that low power circuits of this type necessarily require that high impedance components be used throughout. These components are, or course, susceptible to external interference. Interstage feedback is also a very serious problem which can lead to several types of circuit instability. To minimize these effects, phase changes in the present circuit are carefully controlled so that those stages of the circuit which draw the most current, namely Schmitt trigger 36 and one-shot multivibrator 40, are out of phase with the more sensitive input stages, namely, high pass amplifier 32 and active filter 34. Thus, the design provides a circuit which has no inter-stage instability even though the components on the circuit board are packed at a high density.

Positive feedback from the output (pin 8) of Schmitt trigger 36 is provided through resistor R13 and capacitor C7 to input pin 2. Pin 8 is also tied to +9 volts through pull-up resistor R14. Pin 2, in addition, is connected to the midpoint of a voltage divider network consisting of resistors R11 and R12. In its quiescent state, the output of Schmitt trigger 36 as determined by the resistor network R11, R12 and R13, will be approximately 9 volts. If the signal at pin 3 exceeds the voltage level caused by the resistor network, the output at pin 8 will swing to zero. The voltage at pin 2 will similarly drop as resistors R12 and R13 pull the potential at pin 2 to ground. The output at pin 8 will not return to the original +9 volt level until the input at pin 3 drops below the lower bias level now present at pin 2. Thus, a zero cross-over square wave signal is produced at the output of Schmitt trigger 36 as illustrated in line 3 of FIG. 5. The capacitor C7 in the feedback circuit assures a quick switching response which produces the sharp square-wave output.

Capacitor C5 and resistor R15 differentiate the square-wave output from Schmitt trigger 36 to produce spikes which are capacitively coupled by C6 to the positive input (pin 2) of the one-shot multivibrator 40. The signal at pin 2 is biased to a level determined by the voltage divider network consisting of resistors R16 and R17.

The output from pin 8 of the Schmitt trigger 36 is also tied to the clock input (pin 3) of the recirculating shift register 38. As previously explained, shift register 38 is pre-coded with an 18-bit binary number which uniquely identifies the particular transponder. As pulses received from the Schmitt trigger 36 clock the shift register, the 18 bits are circulated, as described with reference to FIG. 6, so that successive bits are presented at output pin 9. Note that the output from the shift register 38 is also tied, through feedback resistor R19, to the input (pin 1) of the register 38 so that the coded binary number is restored to the shift register 38 at the same time it is being circulated out. A new number can be programmed into the shift register 38 by tying into pin 1 and "jamming" the new number into the input during clocking. This will be more fully explained later.

Returning to the one-shot multivibrator 40, it will be noted that the 4 volt d.c. bias level produced by the voltage divider network consisting of resistors R3 and R4 and capacitor C2, is directly coupled to the negative input (pin 3) of the one-shot multivibrator 40. When a negative spike provided at pin 2 crosses the bias level applied to pin 3, the one-shot multivibrator 40 will conduct current through the LED 42 for a period of approximately 10 microseconds. However, the one-shot multivibrator 40 is gated at pin 5 by the shift register 38 so that there will be a LED pulse only if the output from shift register 38 is a binary "1". If the bit output from the shift register 38 is a binary "0", no output pulse will be generated by the one-shot multivibrator 40, and therefore, no light pulse will be emitted by the LED 42. Note, the diode D1, connected in parallel with resistor R18 between pin 5 of the one-shot 40 and the output (pin 9) of the shift register 38, helps discharge parasitic capacitances which, in turn, assures fast switching.

Figure 7B:
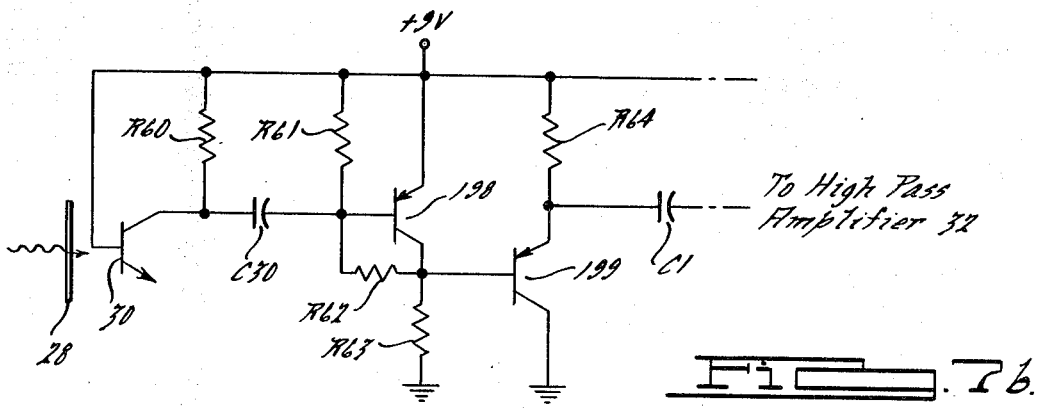
FIG. 7b is a circuit diagram illustrating an alternative embodiment of the transponder shown in FIG. 7.

Referring to FIG. 7b, an alternative embodiment of the first stage of the transponder 12 is shown. The primary motivation for substituting this design is to minimize the quiescent current drain on the battery of the transponder 12 when the phototransistor 30 is exposed to direct sunlight. Specifically, it will be noted that in the embodiment illustrated in FIG. 7a, the battery is connected directly across phototransistor 30 and resistor R2. In other words, a direct current path is provided through resistor R2 between +9 volts and ground whenever the phototransistor 30 is rendered conductive by the incident light. Consequently, any actuation of phototransistor 30 causes a current drain on the battery of the transponder 12. Thus, it can be seen that if the phototransistor 30 is in the embodiment of the transponder 12 illustrated in FIG. 7a is continuously exposed to direct sunlight, the battery of the transponder 12 can be unnecessarily depleted.

The embodiment shown in FIG. 7b rectifies this situation by connecting the phototransistor 30 so that it acts like a photodiode. In particular, the base of the phototransistor 30 is tied to +9 volts and its collector is connected through a capacitor C30 to the base of a transistor 198. The emitter of the phototransistor 30, however, is not tied to ground as in the embodiment described in FIG. 7a. In this manner, the only current available from the phototransistor 30 is its base-to-collector current ($i_{bc}$).

The +9 volts bias potential is also supplied to the collector of phototransistor 30 through resistor R60, to the base of transistor 198 through resistor R61, and directly to the emitter of transistor 198. The collector of transistor 198 is connected to the base of another transistor 199, tied to ground through resistor R63, and returned to the base of transistor 198 through feedback resistor R62. Transistor 199 similarly has its emitter connected to +9 volts through resistor R64 and its collector tied to ground.

With the circuit modified as described, the phototransistor 30 still acts as a variable resistor with the voltage level at its collector dependent upon the magnitude of the incident light. However, since a direct current path is no longer provided through the phototransistor 30 to ground, the quiescent current draw on the battery when the phototransistor 30 is exposed to sunlight is substantially reduced. In addition, due to the direct current block provided by capacitor C30, variations in the magnitude of the output voltage from phototransistor 30 caused by exposure to sunlight will not render transistor 198 conductive. Thus, the power of the battery is conserved.

However, by utilizing the base-to-collector current ($i_{bc}$) of phototransistor 30 instead of its collector-to-emitter current ($i_{ce}$), the amplification of the phototransistor 30 is lost. Consequently, transistor amplifier 198 is included to restore the magnitude of the signal from phototransistor 30. However, as is well known to those skilled in the electronics art, the high gain provided by transistor 198 also produces a high output impedance. Therefore, for impedance matching purposes, transistor 199 is connected in an emitter follower arrangement providing virtually no gain and a low impedance output signal to the high pass filter 32.

One problem which can possibly cause binary numbers to be "dropped" from the output of shift register 38, and thus cause an improper code to be transmitted, is a sluggish clock pulse from Schmitt trigger 36. In the embodiment illustrated in FIG. 7a, the rise time of a clock pulse from Schmitt trigger 36 is approximately 5 microseconds, due primarily to the value of pull-up resistor R14. In order to shorten the rise time and reduce the possibility of a sluggish clock pulse, the value of resistor R14 would have to be lowered. However, lowering the value of resistor R14 will increase the current draw, which, given the limited power supply, is of course undesirable. Accordingly, a different approach must be taken.

In order to improve the sharpness of the clock signal and thereby improve the reliability of the triggering of shift register 38, the alternative embodiment of the transponder 12 shown in FIG. 7c can be employed. The design illustrated in FIG. 7c essentially utilizes a pair of D-type flip-flops 252 and 254 as replacements for the op-amp Schmitt trigger 40 and the gated one-shot 40, respectively, used in the embodiment illustrated in FIG. 7a. The flip-flops 252 and 254 shown are CMOS type, having a rise and fall time of 100 nanoseconds. Current drain is in the nanoamps.

In the embodiment illustrated in FIG. 7c, the output from the active filter 34 is a.c. coupled through a capacitor C33 to the base of a transistor 250. The base of transistor 250 is also connected to the anode of a diode D3 which has its cathode tied to ground. The collector of transistor 250 is connected to B+ through a resistor R70 and to the clock input of flip-flop 252, and its emitter is tied to ground. The emitter and base diode of transistor 250 act as a "half wave" current source to transistor 250. The data (D) input of flip-flop 252 is tied to B+ and its Q output is connected to its reset terminal (R) through a time delay network comprised of resistor R71 and capacitor C31. Another diode D4 is connected between the midpoint of resistor R71 and capacitor C31 and ground so that the full delay time is provided in only one direction.

The Q output from flip-flop 252 is provided to the clock input terminal (pin 3) of shift register 38 and to the clock input of flip-flop 254. The output terminal (pin 9) of shift register 38 is provided to the data (D) input of flip-flop 254. The Q output terminal of flip-flop 254 is connected to its reset terminal (R) through a time delay network comprised of resistor R72 and capacitor C32. Diode D5 is also provided between the midpoint of the time delay network and ground and serves the same function as diode D4.

The Q output from flip-flop 254 drives an LED driver network 260 comprised of a pair of transistors 256 and 258. The base of transistor 256 is connected through a resistor R73 to the output of flip-flop 254 and its collector is tied to ground. The emitter of transistor 256 is connected to B+ through a resistor R74 and to the base of transistor 258. The emitter of transistor 258 is also connected to B+ and its collector is tied through LED 42 and a resistor R75 to ground. The LED driver circuit 260 provides a relatively constant source of current to LED 42 irrespective of changes in the battery supply voltage. Accordingly, the intensity of the pulses emitted by LED 42 will appear more uniform over a wider range of supply voltages.

In operation, when the output signal from the active filter 34 exceeds the turn-on bias of transistor 250, transistor 250 fires providing a relatively "sloppy" clock signal to flip-flop 252. When clocked, flip-flop 252 will provide a strong and unambiguous clock pulse to shift register 38. However, since shift register 38, as well as flip-flops 252 and 254, are clocked on the trailing of a positive pulse, shift register 38 will not shift, as shown in the accompanying timing diagram, until flip-flop 252 is reset after a time delay t1 determined by resistor R71 and capacitor C31. When flip-flop 252 is reset, flip-flop 254 is also clocked. However, the Q output of flip-flop 254 will not go HI unless a logical 1 output is also provided to its data input (D) from shift register 38. If both conditions are satisfied, the Q output of flip-flop 254 will go III for a time period t2 determined by resistor R72 and capacitor C32, thereby causing driver circuit 260 to fire LED 42 for a corresponding period of time. If a logical 0 is present at the output of shift register 38 when flip-flop 254 is clocked, the Q output of flip-flop 254 will remain LO and driver circuit 260 will not fire LED 42. Accordingly, it can be seen that LED 42 is fired only when a logical 1 is provided at the output of shift register 38. Note also, that the time delay introduced between the clocking of flip-flop 252 and the clocking of shift register 38 insures that the pulses emitted by the transponder 12 will be properly interspersed between the receipt of the interrogator pulses.

Now looking to FIG. 8, the interrogator 14 is shown in block diagram form. The interrogator 14 is seen to comprise a lense 48 for focusing the received pulse from the transponder 12 on detector 50. A filter 52 is interposed between the lense 48 and the detector 50 to restrict the transmission of light energy to the infrared band. For example, the filter 52 may restrict transmission of wave lengths below 9,500 Angstroms. And the detector 50 is designed to be responsive to light energy having wave lengths below 9,700 Angstroms. Accordingly, the filter 52, acting in cooperation with the detector 50, restricts the response of the interrogator 14 to light energy having wave lengths between 9,500 and 9,700 Angstroms. The output of the detector 50 is received by a preamplifier 54 which, as will be explained hereinafter, serves as a high pass filter. This low frequency filter reduces sunlight effects and the effects of 60 cycle hum. The output of the preamplifier 54 appears as illustrated in the figure and contains large signals representative of reflected interrogator pulses and a substantially smaller signal representative of received transponder pulses. The signal from the preamplifier 54 is received by a blanking circuit 56 which also receives a blank impulse, as illustrated, at an appropriate time to remove the signal representative of reflected interrogator pulses. The blanking operation is inherently imperfect thereby leaving slight edges or "glitches", as shown in the figure. The signal from the blanking circuit 56 is delivered to a summing junction 58 through a direct signal path 60 and through a delayed and inverted path 62. The delayed and inverted path 62 includes a delay line 64 and an inverter 66. Presuming now that the signal from the blanking circuit 56 includes low frequency variations such as may be caused by a gradually changing background level of radiation, the signal through the direct path 60 may appear as represented in the figure as a gradually declining signal having the transponder pulse superimposed, while the signal through the delayed and inverted path 62 will appear as a gradually increasing signal with the inverted transponder pulse superimposed. Note that the delayed and inverted signal will be gradually increasing in an equal and like amount as the gradually decreasing portion of the direct signal. Note also that the period of delay of the signal through the delayed and inverted path 62 is selected to be approximately equal to the duration of a transponder pulse. The signal from the summing junction 58 represents the summation of the signals through the direct path 60 and the delayed and inverted path 62. The resultant signal, therefore, appears as conjuctive square waves with one square wave being positive going and the succeeding square wave being negative going. The square waves are conjuctive because the period of delay introduced by the delay line 64 is set to be substantially equal to the duration of the transponder pulse. Thus, as can be seen, the summing operation removes only the unwanted low frequency background noise and not the desired information from the transponder 12. Note that the subtraction of low frequency background noise in the present system is compensated in substantially real time relationship with the sampling of the signal. In this manner, the present system avoids to a large extent the disadvantage inherent in the type of system wherein the signal and the background are sampled at different points in time and then subtracted. In the latter system, if the background varies in the interim, an inaccuracy will be introduced into the background compensation. An integrating circuit 60 receives the conjuctive square waves and provides an integration thereof at its output to yield a signal which is triangular in configuration as illustrated. More specifically, during the period of the first square wave, the integration yields an increasing ramp signal, and during the period of the second or inverted square wave, the integration yields a decreasing ramp signal. Since the two square waves are substantially equal in included area, the signal from the integrator increases substantially linearly to a given value and then decreases substantially linearly to the original value of the signal. Note that the conjuctive square waves may include some high frequency noise or ripple superimposed thereon. The function of the integration operation is to remove this high frequency noise from the signal. Accordingly, it can be seen that the combination of the summation of the delayed and inverted signal with the original signal and the integration of the result of the summation, is highly effective in removing both low frequency and high frequency noise from the signal.

The integrated signal is supplied via an a.c. coupling capacitor C8 which removes any d.c. bias, to a comparator 68 which compares the output of the integrator to a bias threshold as illustrated. The comparator converts the trianulated wave from the integrator 60 to a square wave that is switched from the off position for signals of greater amplitude than the bias threshold.

The signal from the integrator 60 is also supplied to an ambiguous pulse rejection circuit 70 which discriminates between "good" transponder pulses and ambiguous signals. The circuit 70 recognizes as ambiguous, digital information which falls within a predefined "gray area" and resets the four-times redundancy counter 76 accordingly. This assures that "weak", and therefore potentially erroneous, information received by the interrogator 14, while the transponder 12 is in the fringe area of the communication zone or when the battery of the transponder 12 is marginal, will not ultimately be relied upon the interrogator 14 in identifying the transponder 12. Instead, by resetting the redundancy courser 76, the circuit postpones the decision-making process until the transponder 12 is well within the interrogator's field or reception, or where appropriate, indicates that the battery of the transponder 12 needs to be replaced.

The output of the comparator 68 is received by a latch circuit 72 which also receives a clock pulse as illustrated. The latch circuit 72 is adapted to provide an output pulse for the duration of the clock pulse when a comparator output pulse is received at its input. Ordinarily, the comparator output is provided after the clock pulse is initiated, therefore, the initiation of the latch output is normally in accordance with the initiation of the comparator output. However, the latch is adapted to sustain its output until both the clock pulse and comparator output pulse are terminated. Thus, since the comparator pulse normally terminates prior to the termination of the clock pulse, the latch output will ordinarily terminate upon termination of the clock pulse. In summary, the latch output pulse normally is initiated upon initiation of the comparator output pulse and is normally terminated upon termination of the clock output pulse. This timing of the latch output assures that only comparator output pulse representative of transponder pulses will be recognized since only those pulses existing during the clock "window", i.e. the duration of the clock pulse, will be effective to provide a latch output pulse to the remainder of the circuitry.

The output of the latch circuit 72 is provided to an auto synchronous decoder 74 which examines the sequence of binary "1's" and binary "0's" and is operative to determine the start of the binary code. Upon determination by decoder 74 of the start of the code, a pulse is provided on line 78 which increments the four-times redundancy counting circuit 76. The auto synchronous decoder 74 then receives the next sequence of bits from the latch circuit 72 and repeats the examination process until the start of the code is again determined. When this occurs, another pulse is provided on line 78 which again increments the four-times redundancy counter 76. If this sequence occurs twice more, the four-times redundancy counter 76 emits a pulse on line 79 which permits the code present in the decoder 74 to be transmitted in the proper sequence to the controller for further processing by the system.

Turning now to FIGS. 9a and 9b, a schematic diagram of the interrogator 14 is shown. As will become readily apparent from the following detailed description, a substantial portion of the circuitry in the interrogator 14 is devoted to the removal of extraneous noise and spurious signals from the desired information. This circuitry is necessary to insure the proper operation of the system under possible adverse conditions. Broadly, it can be stated that the interrogator 14 remotely clocks the transponder, receives the return transponder pulses, "cleans up" signal, determines whether the information is "good", decodes the signal, and finally sends the information to a controller where various checks are conducted on the status of the object identified.

As stated previously, the interrogator 14 emits a sequence of infrared pulses at a clock frequency which activates the transponder 12. The transmitting section of the interrogator 14 comprises an array of light emitting diodes (LED) 75 driven by a series of driver transistors 73. The base terminals of the LED drivers 73 are commonly tied to the output (pin 13) of a one-shot device 165. The one-shot 165 is clocked by pulses received at its clock terminal (pin 2) from a free-running local clock 110 (to be substantially described in greater detail). When an output pulse is generated by one-shot 165, the LED drivers 73 become conductive, thereby switching on the LED array 75. When the pulse from the one-shot 165 terminates, the LED drivers 73 cease conducting and the LED array 75 is turned off. The duration of the pulses produced by one-shot 165 is determined by the time constant associated with variable resistor R39 and capacitor C21. Thus, it can be seen that by adjusting the value of resistor R39, the percentage on-time of the LED array 75 during each clock period can be varied. Resistor R39 is generally set to provide an array period of sufficient duration (e.g. 30 microseconds) to insure proper remote clocking of the transponder 12.

The receiver section of the interrogator 14 comprises a cylindrically-shaped lense 48 which focuses the received transponder pulses on the detector 50. The cylindrical configuration of the lense 48 determines the field of reception of the detector 50. Disposed between the lense 48 and detector 50 is a filter 52 which, as previously explained, restricts light transmission below a predetermined wavelength; (e.g. 9,500 Angstroms). In addition, the detector is designed to be responsive only to wavelengths below a certain maximum; (e.g. 9,700 Angstrom.) Thus, the response of the interrogator 14 is limited to a predefined wavelength band.

Detector 50 has its anode tied to ground and its cathode connected to the gate of a field-effect transistor (FET) 80. The FET 80 has a high input impedance to minimize the effect of noise on the system. The drain of FET 80 is connected to +15 volts and through by-pass capacitor C9 to ground. The source is connected to the negative input of an operational amplifier 82 and to a bias resistor R20. The other end of resistor R20 is tied to −15 volts. By-pass capacitor C10 serves to shunt any high frequency disturbances on the −15 volts supply to ground. The output from the operational amplifier 82 is returned through a multiple feedback network to the gate of FET 80. The multiple feedback network comprises two parallel connected paths 84 and 86. High frequency feedback path 84 consists of resistor R23 which has a large resistive value for high gain. Low frequency feedback path 86 consists of series resistors R21 and R22, and capacitors C11 and C12, connected to parallel between the common junction of resistors R21 and R22 and ground. The capacitive values of C11 and C12 are relatively large so that high frequencies are effectively shorted to ground. Consequently, the low frequencies are returned at a significantly greater amplitude through the feedback network to the input of the preamplifier 54. In this manner, the preamplifier 54 is prevented from becoming saturated by low frequency signals or d.c. light levels as sunlight strikes the detector 50.

Figure 9C:
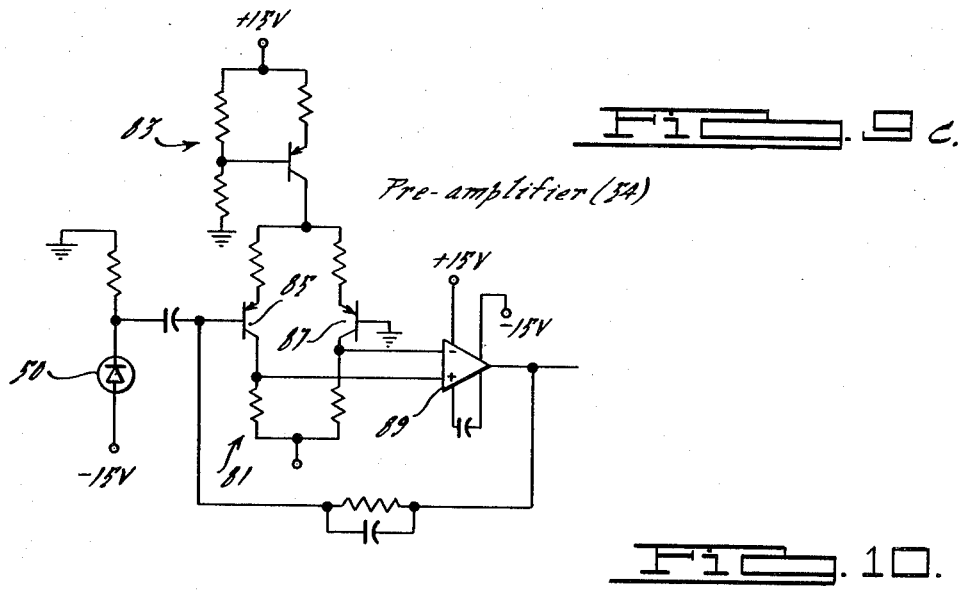

Referring momentarily to FIG. 9c, an alternative design of the preamplifier 54 of the interrogator 14 is shown. The embodiment illustrated in FIG. 9c essentially comprises an emitter coupled differential amplifier 81 connected to a constant current source 83. The circuit effectively acts as a comparator by comparing the potential of the signal at the base of transistor 85, which is dependent upon the voltage drop across photodiode 50, while the ground potential at the base of transistor 87. The difference in the two potentials is then amplified by operational amplifier 89.

This embodiment of preamplifier 54 illustrated in FIG. 9c provides lower noise than the embodiment shown in FIG. 9a, as well as improving the frequency bandwidth of the interrogator 14. The improved frequency bandwidth of the preamplifier 54 in FIG. 9c is desirable from the standpoint that it results in the production of sharper square wave signals. This can be significant since overly long trailing edges on the reflected interrogator pulses detected by detector 50 can interfere with the substantially smaller transponder pulses interposed therebetween. However, it is to be understood that the embodiment of the preamplifier 54 shown in FIG. 9a will adequately perform its intended function.

Returning to FIG. 9a, the output from preamplifier 54 is d.c. coupled through a resistor R24 to the negative input of amplifier 88. The positive input of amplifier 88 is tied to ground, and the output from pin 6 is returned through feedback resistor R25 to the negative input (pin 2). The amplifier 88 amplifies the signal approximately by a factor of ten.

The amplified signal is then fed to a blanking circuit 56 which blanks the reflected interrogator pulses from the signal. The blanking circuit 56 is essentially a device which switches from a low impedance state to a high impedance state when the proper enabling pulse is received. The blanking circuit 56 is enabled by the leading edge of a negative-going square-wave pulse received on line 92 from a one-shot device 90. The one-shot 90 is, in turn, enabled by the trailing edge of a clock pulse received on line 91 from the local clock 110 (to be subsequently described). The duration of the pulse generated by the one-shot 90 is determined by the time constant associated with resistor R25 and capacitor C14, and may be varied by adjusting potentiometer R25. However, it will be appreciated that the duration of the blanking pulse generated by one-shot 90 must be greater than the duration of the array pulse generated by one-shot 165 to insure that the entire reflected interrogator pulse will be subtracted from the signal.

Returning momentarily to FIG. 8, it will be recalled that the transponder pulses are interposed between the reflected interrogator pulses, as shown in the accompanying signal diagram. Prior to the receipt of a reflected interrogator pulse, the one-shot 90 generates an enabling pulse which switches the blanking circuit 56 to its high impedance state. The circuit remains enabled for the duration of the pulse from the one-shot 90, causing the reflected interrogator pulse to be blocked from the signal. The voltage level in blanking circuit 56 is held in this "hold" state by holding capacitor C15. The blanking process, however, is inherently imperfect, leaving a small trailing edge at the end of the subtracted interrogator pulse. The enabling pulse is then terminated, permitting the blanking circuit 56 to return to its low impedance or "sampling" state, during which time that portion of the signal containing the information received by the interrogator 14 from the transponder 12 is passed. At the end of the sample period, prior to the receipt of the next reflected interrogator pulse, the circuit 56 is re-enabled by another pulse from the one-shot 90, thus switching the blanking circuit 56 back to its high impedance state. Once again, the information on the line during the duration of the one-shot pulse is removed from the signal provided at the output of the blanking circuit 56. Accordingly, it can be seen that the resulting signal consists of a series of transponder pulses interposed by a series of small trailing edge remnants of the subtracted interrogator pulses.

The signal from the blanking circuit 56 is provided to a summing junction 58 through a direct signal path 60 and through a time delay and inverted path 62. The signal from the blanking circuit 56 characteristically contains a certain amount of low frequency background noise. It is the function of this section of the circuit to remove these unwanted variations from the signal without destroying the desired transponder information.

The output from blanking circuit 56, taken from pin 10, is connected to a delay line 64 and to summing junction 94 through series resistor R26. The other end of delay line 64 is tied to ground through resistor R28 and through resistor R29 to the negative input (pin 2) of an operational amplifier 96. The positive input (pin 3) of the amplifier 96 is also connected to ground, while the output from the amplifier 96 is returned to its negative input (pin 2) through feedback resistor R30. The output from the operational amplifier 96 is also connected to the summing junction 94 through resistor R27. The value of feedback resistor R30 is selected so that the amplifier 96 has a gain slightly greater than unity to compensate for the inherent loss in the time delay operation.

Returning again momentarily to the signal diagrams accompanying FIG. 8, a graphic representation of an exemplary portion of the signals appearing at the summing junction 94 is shown. As can be seen the signal provided to the summing junction 94 along the direct path 60 is substantially equivalent to the signal at the output of the blanking circuit 56. The signal provided to the summing junction 94 via the delayed and inverted path 62, meanwhile, has been shifted with respect to time by delay line 64 and inverted by amplifier 96. It will be noted that the amount of delay introduced into the signal along path 62 is equivalent to the width of a transponder pulse, typically 10 microseconds. The purpose for selecting the time delay to be this precise amount will be appreciated from the following discussion of the integrator stage 60 of the interrogator 14. As will be appreciated by those skilled in the electronics art, when the two signals are summed at junction 94, substantially all of the unwanted low frequency background variations will be subtracted from the signal. This is due to the fact that, in real-time relationship, the two opposed signals were sampled at approximately the same point in time. Therefore, the amount of variation in the low frequency background noise which could have occurred during the time period between the two sampling points is kept to a minimum. In this manner, the subtraction process is more complete, leaving a substantially constant level signal having imposed thereon in spaced relationship a series of conjunctive square wave pulses. Note that as a by-product of the summation operation, the negative version of each transponder pulse is added to the signal.

The resultant signal from the summing junction 94 is applied to the negative input (pin 2) of an operational amplifier 96 having its positive input (pin 3) tied to ground. The output (pin 6) from amplifier 96 is returned to the negative input (pin 2) through parallel connected capacitor C15 and resistor R28, thus making the amplifier 96 appear as an integrator. In this manner, the conjunctive square wave pulses applied to the input of the integrator 60 are transformed into triangular shaped pulses as shown in FIG. 8. Specifically, the negative half of the square wave input signal (applied to the negative input terminal) produces a positive ramp signal at the output, and the positive half of the square wave signal produces a negative ramp which reduces the output signal to its original level. Thus, in order to obtain a "good" triangular pulse from the output of the integrator 60, it can be seen that it is important that the time delay introduced into the signal by the preceeding stage of the circuit be at least as long as the width of a transponder pulse. If the delay were less than the width of a transponder pulse, the summing operation would subtract part of the transponder pulse from the signal, which would give rise to a truncated triangular pulse at the output of integrator 60 whose maximum amplitude could possibly fall below the bias threshold level of comparator 68. This would result in the interrogator 14 failing to recognize the information as a transponder pulse, which, of course, would result in a loss of information.

The signal applied to the input of the integrator 60 also invariably contains a certain amount of high frequency noise which appears as irregularities or "chatter" in the square wave signals, as shown in signal diagram in FIG. 8. The integration operation effectively eliminates this chatter from the signal thereby serving as a high frequency filter for the system.

The triangular-shaped signal from the integrator 60 is supplied to the positive input (pin 2) of a comparator amplifier 98 through an a.c. coupling capacitor C8. The coupling capacitor C8 removes any d.c. bias which may be present in the signal. The positive input of amplifier 98 is also tied to ground through resistor R29. The negative input (pin 3) is connected to ground through capacitor C16 and to the wiper of a variable resistor R31. One side of variable resistor R31 is tied to ground, and the other side is connected to +15 volts through resistor R30. The resistive value of R31 is adjusted to set the appropriate bias threshold level at pin 3 of the comparator amplifier 98. In operation, the output (pin 7) from the comparator amplifier 98 remains low until the signal at its positive input (pin 2) exceeds the bias threshold level at its negative input (pin 3). When this occurs, the output from the comparator goes high and remains high until the potential at pin 2 drops below the threshold level at pin 3. Thus, it can be seen that comparator 68 outputs a square wave signal whenever the integrator 60 provides a triangular-shaped transponder pulse which exceeds the bias threshold level of the comparator amplifier 98, as shown in the signal diagram in FIG. 8.

The output (pin 7) from a comparator 98 is supplied to one of the inputs (pin 9) of a NAND gate 106. The same input of NAND gate 106 is also tied to +5 volts through pull-up resistor R35. This serves to fix the voltage swing of the input pulses to NAND gate 106 from the comparator 68 to a maximum of +5 volts. The other input (pin 10) of NAND gate 106 is connected to the output of a one shot device 113. The input (pin 5) of one-shot 113 is connected to the output of another NAND gate 108. Connected across pins 10 and 11 of one-shot 113 is a capacitor C30. Pin 11 is also tied to one side of a potentiometer R60, which has its wiper terminal connected to +5 volts and to pin 14 of one-shot 113. The function of one-shot device 113 will subsequently be explained in connection with the description of the ambiguous pulse rejection circuit 70.

One of the inputs to NAND gate 108 is tied to the output of the local clock 110. With the other input to NAND gate 108 connected directly to +5 volts, NAND gate 108 merely inverts the output signal from local clock 110. Thus, at pin 5 of one-shot 113 is produced the inverted clock signal designated CLOCK.

Local clock 110 comprises a pair of one-shot devices 112 and 114 connected in series, which together establish the width of the clock pulse. Specifically, the time constant determined by the values of resistor R36 and capacitor C18 establishes the leading edge of the clock pulse, and the time constant determined by the values of resistor R37 and capacitor C19 establishes the trailing edge of the clock pulse. With the output (pin 12) from one-shot 114 returned to the input (pin 2) of one-shot 112 via line 116, local clock 110 becomes a free-running device.

The outputs from NAND gates 106 and 108 are applied to the set and reset inputs, respectively, of an R-S flip-flop 118. Thus, assuming for now that the output from one-shot 113 goes HI whenever the clock signal goes LO, it can be seen that flip-flop 118 is set—i.e. the output on line 120 goes high—when both the output from comparator 68 is HI and the clock signal applied to the input of NAND gate 108 is LO. In addition, the output from latch 72 on line 120 will remain HI until both the comparator output goes LO and the clock signal goes HI. Referring again to the timing diagram illustrated in FIG. 8, it becomes apparent that as long as the comparator output pulse appears during the time period when the clock signal is LO, the latch circuit 72 will generate a HI output. This time period during which the clock signal is LO is referred to as the clock "window", because it is during this interval that the interrogator 14 "looks" for a transponder pulse. Since it is the clock signal which resets the flip-flop 118, it becomes irrelevant precisely where within the clock window the transponder pulse appears.

Returning momentarily to comparator 68, it should be noted that the bias threshold is preferably set at a level greater than the magnitude of possible noise variations which may be present in the signal from integrator 60, yet low enough to recognize "good" transponder information. Invariably, however, signals will be received by the interrogator 14 which fall into a "gray area"—i.e. larger than typical noise variations, but smaller than the expected amplitude of a "good" transponder signal. This most frequently occurs when the transponder 12 passes through the fringe of the interrogator's field of reception. As the transponder 12 enters this area, the strong output pulses from the interrogator are sufficient to cause the transponder 12 to begin generating its code. However, the substantially weaker transponder signal, when transmitted at this distance from the interrogator detector 50, appears not much larger than the random noise signals which may also be picked up by detector 50. Thus, it can be seen that at this point in the identification process, it becomes possible for the interrogator 14 to consistently "drop" good information which would pass the four-times redundancy check 76 and result in an erroneous identification.

To minimize the possibility of this occurring, an ambiguous pulse rejection circuit 70 is provided. This circuit 70 consists of another comparator amplifier 100 having supplied to its positive input (pin 2) the same signal supplied to the positive input (pin 2) of comparator amplifier 98. In addition, the same bias threshold supplied to the negative input (pin 3) of amplifier 98 is also tied to the negative input (pin 3) of amplifier 100, but through a voltage divider network consisting of resistors R32 and R33, and capacitor C17. The values of the components in this network are selected to establish a bias potential at pin 3 of amplifier 100 of approximately two thirds the bias threshold level supplied to pin 3 of amplifier 98. Consequently, the threshold level supplied to amplifier 100 is below the amplitude level of a transponder signal received from a fringe area. In this manner, weak signals which would be ignored by comparator 68 are recognized by comparator amplifier 100. However, because the bias threshold at pin 3 of amplifier 100 is substantially below the "safe" level provided to comparator 68, the possibility also exists that amplifier 100 may provide an output signal in response to a random non-transponder signal. Thus, it will be appreciated that pulses recognized by comparator amplifier 100, but not recognized by comparator 68 constitute ambiguous pulses.

To identify these ambiguous pulses, the output from comparator amplifier 100 is provided to a latch circuit similar to latch 72 consisting of NAND gate 102 and R-S flip-flop 122. The output from flip-flop 122, as well as the inverted output from flip-flop 118 are applied to the two inputs of another NAND gate 104. The output from NAND gate 104 is connected to the data (D) input of a J-K flip-flop 124 which is clocked by the clock signal from local clock 110. The positive (Q) output from flip-flop 124 is provided through a three-input NAND gate 138 to the RESET terminals of the counter device 140 in the four-times redundancy count circuitry 76. Thus, as can be seen, if an ambiguous pulse is detected—i.e. the output from flip-flop 122 is HI and the output from flip-flop 118 is LO (thereby providing two HI inputs to NAND gate 104, since the inverted output from flip-flop 118 is provided to NAND gate 104)—a LO signal will be present at the data (D) input to flip-flop 124 which, when clocked by the trailing edge of the clock "window", provides a LO pulse at its Q output. The LO pulse at the input of NAND gate 138 renders the output therefrom HI, which, in turn, resets the redundancy counter 140.

The function of one-shot device 113 will now be explained. As the condition of the transponder battery becomes marginal, the pulses emitted by the transponder 12 begin appearing later within the clock window. In addition, since the greatest power draw on the battery occurs when the transponder 12 emits an infrared signal, a noticable power drain can occur during the transmission of a sequence of infrared pulses. More specifically, the succeeding binary 1's in a sequence of 1's will appear noticably later within the clock window than the first binary 1 in the sequence, or may even appear outside the clock window and be "read" as binary 0's. As will subsequently be appreciated from the description of the parity check in the four-times redundancy count circuit 76, as long as the error is not repetitive, the interrogator 14 will "catch" the error and restart the interrogation process.

However, when the transponder battery is marginal, and the encoded word further includes a sequence of binary 0's that provides an opportunity for the battery to recoever, the same error can be duplicated when the sequence of bianry 1's is repeated. The possibility of a repetitive error of this nature occurring is greatest when the transponder 12 is within the fringe area of the interrogator's reception zone.

Figure 10:
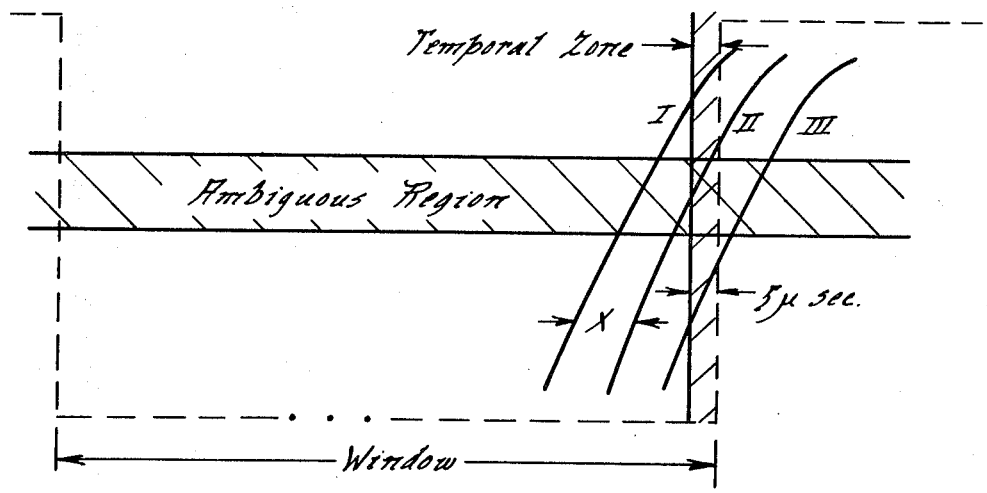
FIG. 10 is a graph illustrating the ambiguous pulse region of the interrogator.

Referring to FIG. 10, a condition capable of causing a repetitive error is graphically illustrated. FIG. 10 represents a situation wherein a sequence of three binary 1's is emitted by a transponder 12 having a marginal battery. The first transponder pulse in the sequence (I) exceeds the upper boundary of the ambiguous region prior to the termination of the clock window and therefore is properly read as a binary 1. Similarly, the second transponder pulse (II) also exceeds the ambiguous region prior to the termination of the clock window and is properly read as a binary 1, but appears later within the clock window than the first transponder pulse due to the drain on the transponder battery resulting from the emission of the first transponder pulse. Because of the further drain on the transponder's battery caused by the emission of the second transponder pulse, the third transponder pulse in the sequence (III) is erroneously read as a binary 0. Since the third pulse (III) does not even exceed the lower threshold level of the ambiguous region prior to the termination of the clock window, the interrogator 14 does not consider the pulse to be ambiguous.

As previously stated, this situation can be repeated if the battery of the transponder 12 is given an opportunity to recover prior to the time when it again emits the sequence of binary 1's. To prevent the possibility of this repetitious error from causing an erroneous identification, a "temporal" ambiguous zone has been added to the last five microseconds of the clock window. Specifically, it has been determined that transponder pulses that appear within the last five microseconds of the clock window are potentially erratic and therefore should be ignored.

Thus, returning to the example illustrated in FIG. 10, it can be seen that the second transponder pulse (II) in the sequence will fall within the temporal zone and will therefore be treated as an ambiguous pulse. Moreover, since the horizontal distance (X) between each successive pulse in FIG. 10 represents the maximum amount of delay which can occur between successive transponder pulses as a result of battery drain, it can be seen that it is impossible for a transponder pulse similar to (III) to occur without a previous transponder pulse falling within either the ambiguous or temporal regions. Furthermore, if the condition of the transponder battery is such that the third (III) transponder pulse is the first pulse detected, then all of the digits in the encoded word would appear as binary 0's and the code would not be satisfied. This, of course, would indicate that the transponder battery needs to be replaced.

The concept of a temporal ambiguous zone is incorporated into the interrogator 14 by adding one-shot device 113. Specifically, the value of potentiometer R60 is adjusted so that the time period associated with one-shot 113, as determined by the values of capacitor C30 and potentiometer R60, is five microseconds shorter than the period of the clock window. Consequently, since one-shot 113 is enabled by the leading edge of the clock window, a LO output pulse will be provided to the input (pin 10) of NAND gate 106 five microseconds prior to the termination of the clock window. Thus, if comparator 68 produces a HI output signal after the output from one-shot 113 goes LO, the output from NAND gate 106 will not go LO and set R-S flip-flop 118. Therefore, it can be seen that flip-flop 118 cannot be switched to its set state after the output from one-shot 113 goes LO.

However, if a signal has already occurred during the clock window that exceeded the upper threshold level and set flip-flop 118, flip-flop 118 will not be reset when the output from one-shot 113 goes LO. In addition, if a signal exceeding the upper threshold level has not already been detected when the output from one-shot 113 goes LO, flip-flop 118 will be "clamped" in its reset state, thereby maintaining a HI signal at the input (pin 21) of NAND gate 104. Thus, if a signal occurs that exceeds the lower threshold level of comparator amplifier 100 within the remaining five microseconds of the clock window, thereby setting flip-flop 122, the output from NAND gate 104 will go LO and the late signal will be treated as an ambiguous pulse.

In summary, if R-S flip-flop 122 is set and flip-flop 118 is reset when the output from one-shot 113 goes LO, or if flip-flop 122 is set after the output from one-shot 113 goes LO but prior to the termination of the clock window, the signal will be treated as an ambiguous pulse and the four-times redundancy counter 140 will be reset to zero. In other words, any signal that exceeds the lower threshold level of the ambiguous region but does not exceed the upper threshold level of the ambiguous region prior to five microseconds before the termination of the clock window is treated as an ambiguous pulse causing the interrogation process to be repeated until no ambiguous pulses are encountered during the four-times redundancy check.

Furthermore, it will be noted that a J-K flip-flop 124 is provided to insure that the decision to reset the redundancy counter 140 is not made until the entire clock "window" period has passed. This has the effect of preventing a possible "premature" decision by logic gate 104 from erroneously resetting counter 140. Since the bias level applied to comparator amplifier 100 is substantially lower than that applied to amplifier 98, it is possible for R-S flip-flop 122 to be set before flip-flop 118, even though a "good" transponder pulse is, in fact, present. Because the switching time of a simple NAND logic gate is so fast, this small differential in the reaction times of comparator amplifiers 98 and 100 to a "good" transponder pulse can be sufficient to cause NAND gate 104 to prematurely cause a HI reset pulse to be provided to counter 140 J-K flip-flop 124, therefore, waits until the end of the clock window period before passing the output signal from NAND gate 104, thereby insuring that redundancy counter 140 is reset only when a truely ambiguous pulse is received.

Thus, the practical effect of the ambiguous pulse rejection circuit 70 is to postpone the identification process until the transponder 12 is well within the interrogator's field of reception. In addition, if at any time during the identification process, an ambiguous pulse is received, the pulse is rejected and all information received up to this point from the transponder 12 within the interrogator's reception zone is ignored, and the interrogation process is repeated. Since the interrogator 14 will cycle through the identification process (including the four-times redundancy check) almost two complete times for every foot of travel by a vehicle moving at 30 miles per hour, the chances of the interrogator 14 failing to make at least one good identification of the transponder 12 before it leaves the interrogator's field of reception are extremely small, (assuming the transponder's battery is not in need of replacement.)

As one means of remotely checking the condition of the interrogated transponder's battery, the output signal from one-shot 113 is provided through an inverter 115 to one of the inputs of a dual-input NAND gate 117. The other input to NAND gate 117 is connected to the output of comparator amplifier 98. In this manner, if what would otherwise be considered a good transponder pulse is received at any time other than during the clock window, absent the temporal zone, a LO output signal is produced by NAND gate 117 indicating that the transponder's battery needs to be checked. Of course, this type of remote check will only function properly with a battery whose output voltage diminishes as the condition of the battery declines.

The output from latch circuit 72 is provided to one of the inputs of a dual input NAND gate 126. The other input of NAND gate 126 is connected to the Q output (pin 1) of a halt one-shot device 130. The output from gate 126 is supplied to one of the inputs to another NAND gate 128. The halt one-shot 130 is normally in its "run" mode; i.e. a high output on Q which makes logic gate 126 appear as an inverter. The Q output (pin 6) from one-shot 130 is provided to the input of a third NAND gate 127. In the run mode, the Q output is normally low, making the output from gate 127 high. Since the output from gate 127 is tied to the other input of NAND gate 128, logic gate 128 also appears as an inverter for the output signals from gate 126. Therefore, it can be seen that while the halt one-shot 130 is in its "run" mode, the data signal on line 120 from latch circuit 72 is inverted twice by logic gates 126 and 128, thereby providing at the output of gate 133 the same signal that appears on line 120. Thus, it becomes apparent that the halt one-shot device 130 controls the flow of data from latch circuit 72. This capability will be more fully appreciated from an explanation of the "halt" mode to be subsequently described.

The output from NAND gate 128 is provided to the input of an 8-bit shift register 132. The serial output terminal (pin 13) of shift register 132 is directly coupled to the input of a second 8-bit shift register 134, which, in turn, has its serial output (pin 13) tied to the input of a 4-bit shift register 136. The three shift registers 132, 134, and 136, totalling a 20-bit capacity are necessary to accommodate the 18-bit transponder code. Shift registers 132, 134 and 136 are serially loaded by the clock pulses received on line 135 from local clock 110. The output from register 132 is loaded into register 134 and the output from register 134 is loaded into register 136.

As will be recalled from the previous discussion concerning transponder 12, there is no way to guarantee that the first bit to be outputted from the 18-bit shift register 38 will correspond to the first digit in the transponder code. Rather, the first bit transmitted by the transponder 12 depends upon where the recirculating shift register 38 happened to stop the previous time the transponder 12 was clocked. Consequently, it can be appreciated that the chances that the first 18-bit word programmed into shift registers 132, 134 and 136 represents the correct transponder word, are quite small; (i.e. 1 in 18). Accordingly, it becomes necessary to devise a code which the interrogator 14 can decipher to determine the location of the start of the word transmitted by the transponder 12.

The information stored in the shift register 38 of transponder 12, by prearrangement, consists of 18 bits, numbered (1) through (18). In devising an appropriate code, it is desirable to commit the fewest possible bits to coding restrictions so as to maximize the total number of different words which may be transmitted. For example, if eight of the 18 total bits available had restrictions placed on them to permit identification of the starting point of the code, only ten bits would be open for encoding. This would provide a total of $2^{10}$ or 1024 possible words. It can be proven mathematically, however, that the most efficient coding scheme for a serially transmitted 18-bit binary word places restrictions on five of the eighteen encoding positions. Accordingly, the task reduces to devising a code which will leave 13 bits open for encoding the message, thus providing a maximum of 8192 possible words.

Referring back to FIG. 6, it will be recalled that the complete bit stream is repetitively transmitted by the transponder 12, thereby permitting the analogy to a circular array which is rotated in sequence past a fixed point 44. Accordingly, the code is referred to as a circular encoding scheme. The restrictions placed on the five of the eighteen bit positions in the devised circular encoding scheme which will be utilized to determine the starting point of the sequence are:

(i) In position (1) or in position (10) the content must be known by prearrangement. In the preferred embodiment, a logical "1" has been arbitrarily selected for position (1).

(ii) In position (10) the content must be the compliment of the content of position (1), and hence is also known by prearrangement due to the arbitrary selection for position (1). In the preferred embodiment, therefore, position (10) must contain a logical "0".

(iii) In position (14) the content is not known by prearrangement, but must be the compliment of position (5).

(iv) In position (17) the content is not known by prearrangement, but must be equivalent to the content of position (8).

(v) In position (18), the content is not known by prearrangement, but must be equivalent to the content of position (9).

In linear form, the five restrictions in the preferred embodiment may be represented as follows:

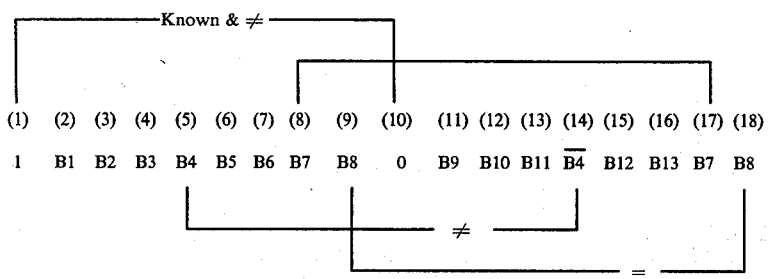

Thus, the bits represented by B1–B13 may be either logical ones or logical zeros, thereby providing the encoding capability of 8192 different words.

To illustrate the operation of the circular encoding scheme, assume, for example, that the decimal number 5555 is to be assigned to a particular transponder. The equivalent binary representation of decimal 5555 is, of course, 1010110110011.

In linear form, the 18-bit encoded word that would be programmed into the transponder's shift register 38 (in a manner to be subsequently described) to represent the decimal number 5555 would appear, in the stereotype position, as follows: (1) (2) (3) (4) (5) (6) (7) (8) (9) (10) (11) (12) (13) (14) (15) (16) (17) (18) 1 B1 B2 B3 B4 B5 B6 B7 B8 0 B9 B10 B11 B4 B12 B13 B7 B8 1 1 0 1 0 1 1 0 1 0 1 0 0 1 1 1 0 1 As can readily be appreciated, in none of the seventeen other possible positions in which the above sequence of bits can be shifted will the five restrictive conditions outlined previously be met. For example, if the entire word is shifted one position to the right so that bit (1) would now be in position (2) and bit (18) would be in position (1), the five restrictive conditions would not be satisfied because bit position (10) would now contain a binary "1". Similarly, if the encoded word is shifted two positions to the right, the five restrictive conditions would not be met because bit position (1) would now contain a binary "0". The remaining fifteen positions will similarly violate at least one of the five restrictions, thereby substantiating the fact that only in the stereotyped position illustrated will all five restrictive conditions be satisfied.

The electronic implementation of the above circular encoding scheme is performed by the auto synchronous decoder 74. The auto synchronous decoder 74 identifies the starting point of the encoded word by continuously clocking the incoming data through the shift registers 132, 134 and 136, and simultaneously examining the shift register outputs corresponding to positions (1), (5), (8), (9), (10), (14), (17) and (18) as indicated in FIG. 9b, until the stereotyped position is recognized. When this occurs, the data is in the correct position in the shift registers 132, 134 and 136; i.e. position (1) (pin 3) of register 132 contains the logical one in position (1) in the transmitted bit stream, position (2) in shift register 132 contains the B1 bit in position (2) in the encoded word, and so on.

The five restrictive conditions outlined above are checked by the auto synchronous decoder 74 in the following manner:

Position (1) (pin 3) of shift register 132 is tied directly to the input of an AND gate 142. Position (10) (pin 4) of shift register 134 is connected through an inverter 146 to the remaining inputs of AND gate 142. The output from AND gate 142 is applied directly to one of the four inputs to AND gate 144. Thus, it will be appreciated that AND gates 142 and 144 combined effectively appear as a single five-input AND gate. The output from AND gate 142 will go HI only when there exists a logical one in position (1) of shift register 132 and a logical zero in position (10) of shift register 134, thus satisfying the first two restrictive conditions. Position (5) (pin 10) of shift register 132 and position (14) (pin 11) of shift register 134 are applied to the two inputs of an exclusive OR gate 148. The output from logic gate 148 is connected to another of the four inputs to AND gate 144. The output from logic gate 148 will go HI only when the bit contained in position (5) is not equal to the bit contained in position (14), thereby satisfying the third restrictive condition. Position (8) (pin 13) of shift register 132 and position (17) (pin 13) of shift register 136 are supplied to the inputs to an exclusive NOR gate arrangement comprising an exclusive OR gate 150 having its output tied directly to an inverter 152. The output from inverter 152 is connected to still another of the four inputs to AND gate 144. The output from inverter 152 will go HI only when the bit contained in position (8) is equal to the bit contained in position (17), thus satisfying the fourth restrictive condition. Finally, position (9) (pin 3) of shift register 134 and position (18) (pin 12) of shift register 136 are applied to another exclusive NOR gate arrangement comprised of exclusive OR gate 154 and inverter 156. The output from inverter 156 is connected to the remaining input to AND gate 144. The output from inverter 156 will go HI only when the bit contained in position (9) is equal to the bit contained in position (18), thereby satisfying the fifth and final restrictive condition. Accordingly, it will be appreciated that the only time the output from AND gate 144 will go HI is when all five restrictive conditions have simultaneously been met.

As an additional precaution, a parity check is provided to insure that a bit is not accidently dropped as the incoming data is clocked through shift registers 132, 134 and 136. Specifically, output pin 11 of shift register 136, which corresponds to position (19), and position (1) (pin 3) of shift register 132 are connected to an exclusive NOR gate arrangement comprised of exclusive OR gate 160 and inverter 162. The output from inverter 162 is tied to one of the inputs to NAND gate 138. Since position (19) corresponds to position (1) of the previous 19-bit segment, if at any time the bit contained in position (1) does not correspond with the bit contained in position (19), indicating that a bit has been dropped during signal processing, inverter 162 provides a zero input to NAND gate 138, driving the output therefrom HI. This resets the redundancy counter 140, which, of course, has the effect of starting the interrogation process over from the beginning.

The output from AND gate 144 is provided through an inverter 158 to a redundancy counter 140 via line 78. Each time a negative pulse is presented on line 78 (pin 14) the redundancy counter 140 is incremented by one. The auto-synchronous decoder 74, however, continued to receive new data from the latch circuit 72 and assuming the first encoded word was accurately identified, will again recognize the stereotype position of the encoded word exactly eighteen clock pulses after the first determination was made and provide another pulse on line 78 to increment the redundancy counter 140 a second time. Thus, it can be seen that the redundancy counter 140 counts the number of times that the auto-synchronous decoder 74 determines the starting point of an identical encoded word.

When this procedure has been repeated four times—i.e. the redundancy counter 140 has counted to four—a pulse is emitted from counter 140 on line 79 and provided to pin 5 of the halt one-shot device 130. Upon receiving a pulse from counter 140, the one-shot 130 switches to its HALT mode which inverts outputs Q and Q. With Q now LO, the output from NAND gate 138 goes HI which resets redundancy counter 140. Additionally, the LO signal from Q on line 164 is provided to the halt terminal (pin 3) of the array one-shot 165, which suppresses the operation of the one-shot 165, thereby shutting down the LED array. With the interrogator's LED array turned off, the transponder 12 located within the transmission field of the interrogator 14 will also cease transmitting its code and return to its inactive state. Thus, by providing means for turning off the transponder 12 once the interrogation process has been completed, the power from the transponder's 9-volt battery is conserved thereby prolonging the life of the battery.

In the HALT mode, the Q output of one-shot 130 is HI, which in turn makes NAND gate 127 appear as an inverter for signals provided at position (18) (pin 12) of shift register 136. The output from NAND gate 127 is connected through another inverter 166 to the DATA OUT terminal, which is connected to the controller 16. Since the encoded word is in the stereotype position in shift registers 132, 134 and 136 when the one-shot 130 is switched to its HALT mode, it can be seen that the first eighteen bits that appear at output pin 12 of shift register 136 will correspond to the correct sequence of the encoded transponder word.

In addition, when one-shot 130 switches to its HALT mode, the HI signal from its Q output terminal is also provided to the input to NAND gate 145. The other inputs to NAND gate 145 are connected to the output of AND gate 144. Since the output of AND gate 144 is always HI when one-shot 130 switches to its HALT mode, it can be seen that NAND gate 145 provides a LO output signal whenever the redundancy counter 76 has counted to four. The output signal (SYNC) from NAND gate 145 is provided to the controller 16 to notify the controller 16 that the next 18 bits received from the DATA OUT terminal of the interrogator 14 correspond to the encoded transponder word in its proper sequence.

In the preferred embodiment, the half one-shot 130 will remain in the HALT mode for approximately 0.2 seconds, after which, it will return to the RUN mode. This time period is determined by the time constant associated with resistor R38 and capacitor C20, and is selected to permit sufficient time for the encoded word to be clocked through shift registers 132, 134 and 136.

In addition, since the controller 16 may be monitoring several interrogators simultaneously, it gives the controller 16 ample opportunity to recognize and process information arriving from each interrogator 14.

Referring now to FIG. 11, a functional block diagram of the controller 16 according to the present invention is shown. The boxes located within the dotted line indicated at 250 represent the devices external to the controller 16. Those devices located within the dotted line indicated at 240 represent the parts of the controller 16 associated with the front panel control functions. The remainder of the block diagram constitutes the heart of the controller 16 including the memory unit 230.

Generally speaking, the controller 16 shown in block diagram form in FIG. 11, is designed primarily for use of the present invention as an identification system for a parking facility. For such an application, the controller 16 is preferably designed to receive the serialized digital data from the interrogator 14 representing the encoded transponder word, check the status of the vehicle identified by the encoded word, and, based on its status, determine whether the vehicle should be permitted to enter or exit the facility as the case may be. In addition, the preferred embodiment of the controller 16 includes means for visually displaying the number of the vehicle interrogated and its status, as well as means for changing the status of a particular vehicle. Also included in the block diagram of the controller 16 is a programmer for programming the transponder 12 and promptly checking its operation to insure that the intended encoded word has been properly entered into the transponder 12.

In addition, it is to be understood that once the interrogated vehicle code has been transferred into the address shift register 232, the controller 16 performs the remaining status check and decision operations within a substantially less time period than the duration of a single clock pulse—i.e. 150 microseconds. As will become apparent to those skilled in the art from the following description, this permits the controller 16 to control any number of individual interrogators 14 within certain limitations.

The controller 16 illustrated in FIG. 11 is shown to monitor three interrogators 14a, 14b and 14c. Each of the three interrogators, 14a, 14b and 14c, have their DATA OUT terminal connected to a data multiplexer 216 (DATA MUX), and their SYNC terminal provided to a sync multiplexer 218 (SYNC MUX). Additionally, the DATA OUT terminals from the three interrogators 14a, 14b and 14c are connected to the various contacts on a multi-position rotary type switch 199. The select terminal of the rotary switch 199 is connected to a display select multiplexer 201 to be subsequently described.

Each of the multiplexers 216–220 have a plurality of inputs, depending upon the number of individual interrogators 14 monitored by the controller 16, and a single output. Of course, demultiplexer 222 has a single input and a corresponding plurality of outputs. Accordingly, the description of multiplexers 216–220 is equally applicable to demultiplexer 222 with the references to "input" and "output" reversed.

In addition, each multiplexer 216–220 has a pair of select terminals connected to the output of a scan counter 224. It will be appreciated from the following description that the number of required select lines is also dependent upon the number of interrogators 14 monitored. Specifically, the number of select lines must be sufficient to provide a unique binary representation for each interrogator 14 plus one.

The scan counter 224 is connected to the system clock 225, and is adapted to count successive sequences of 40 clock pulses. In particular, scan counter 224 provides a 0—0 output to the select terminals of the multiplexers 216-220 during the first 40 clock pulses, a 0-1 output during the second 40 clock pulses, a 1-0 output during the third 40 clock pulses, and a 1—1 output during the fourth 40 clock pulses. Each of the multiplexers 216-220 is adapted to provide at its output the signal on one of its four input lines—or in the case of the OK DEMUX 222, provide its input signal on one of its four output lines—during each of the four 40 clock pulse periods.

The serial output from the DATA MUX 216 is provided to an address shift register 232. The address shift register 232 is hard-wired to provide the three most significant bits in the encoded transponder word to a circuit 228 that determines whether the encoded word is a "valid thousands", and the ten least significant bits in the encoded word to the memory unit 230. The term "valid thousands" refers to a selected group of 1000 consecutive numbers which will be recognized by a particular controller 16. All other numbers are ignored, and will not fall under the control of the controller 16. The output from SYNC MUX 218 is also provided through a sync gate 225 to the decode valid thousands circuit 218. The decode valid thousands circuit 218 is adapted to provide an enabling signal to the memory unit 230 when a sync pulse is received from sync gate 225 only if the three most significant bits in the address shift register 232 at that time are a valid thousands.

The memory unit 230 has two output lines; an in/out (I/O) output and a leased/not leased (L/L) output. Both outputs are connected to an OK DECISION circuit 238 which controls the operation of the gates 15*a*, 15*b* and 15*c* via OK DEMUX 222. In addition, the output from another multiplexer, TYPE MUX 220, is also provided to the OK DECISION circuit 238. The inputs to TYPE MUX 220 are hardwired to correspond to the entrance/exit type of each of the three interrogators 14*a*, 14*b* and 14*c*. For example, assuming that a LO output signal corresponds to an exit interrogator, and a HI output signal corresponds to an entrance interrogator, and interrogators 14*a* and 14*b* are entrance interrogators and interrogator 14*c* is an exit interrogator, the first two inputs to TYPE MUX 220 would be tied to a +5 volts bias potential and the third input would be connected to ground.

As will be recalled from the description of FIG. 9, the interrogator 14 is adapted to produce a sync signal whenever the stereotype position of the encoded transponder word is recognized. Since there is no way of insuring that the first bit received from an interrogator 14 will correspond to the first bit of the encoded word, it will be appreciated that it is highly probable that a sync pulse will be provided to SYNC MUX 218 before the entire 18 bit word has been shifted into the address shift register 232. Since the memory unit is adapted to "read" the contents of the address shift register 232 when enabled by a sync pulse from SYNC MUX 218 (assuming the valid thousands check is satisfied), it can be seen that if this first sync pulse were permitted to enable the memory unit 230, an improper vehicle check would be made.

To prevent this from occurring, each 40 clock pulse period is divided into two periods of 20 clock pulses each. The first 20 clock pulses of each 40 clock pulse period are devoted to clearing the address shift register 232. To prevent the sync pulse received during this period from enabling the memory unit 230, a sync gate 225 is provided. Sync gate 225 is connected between SYNC MUX 218 and the decode valid thousand circuit 228, and is adapted to conduct a sync pulse from SYNC MUX 218 only when a signal is present from scan counter 224 on line 227. In addition, scan counter 224 is adapted to provide a signal on line 227 only during the latter 20 clock pulses in each 40 clock pulse period. Accordingly, it can be seen that sync gate 225 will pass a sync pulse from SYNC MUX 218 only during the latter 20 clock pulses in each 40 clock pulse period. In this manner, it is insured that the entire 18 bit encoded word will have been shifted into address register 232 when the first sync pulse is received by the decode valid thousands circuit 228.

Thus, during the latter 20 clock pulses of each 40 clock pulse period, the DATA MUX 216 continues to provide serial data to the address shift register 232 until a sync pulse is encountered.

The occurrence of a sync pulse during the latter 20 clock pulses indicates that the address shift register now contains the encoded word in its stereotype position. Upon receipt of a sync pulse from sync gate 225, the decode valid thousands circuit checks the three most significant bits in the address shift register 232 to determine if the word is a proper thousands. It will be noted at this point that if the parking facility has a capacity greater than a thousand vehicles, the decode valid thousands circuit 228 can be readily adapted to check more than one thousands group.

If the three most significant bits of the encoded word in the address shift register 232 indicate that the word is a valid thousands, the decode circuit 228 provides an enabling signal to the memory unit 230 which accesses the memory to the memory address corresponding to the 10 least significant bits in the address shift register 232. To check the status of the vehicle identified, the memory unit 230 "reads" the information located at the memory address accessed. Each address location in the memory unit 230 contains two bits of information. The logic state of the first bit indicates whether the identified vehicle is in or out of the parking facility, and the logic state of the second bit indicates whether the identified vehicle is leased or not leased. Thus, it can be seen that for a parking facility having a capacity of a thousand vehicles, the memory unit 230 requires a capacity of only 2,000 bits. As will be appreciated by those skilled in the art, this memory requirement is substantially less than would be required if all of the individual vehicle codes were stored in the memory unit 230. Thus, by utilizing the vehicle code as the memory address, a substantial savings in required memory capacity is realized.

The information contained at the memory address accessed is provided to the OK DECISION network 238. In addition, the two output signals from the memory unit 230 are provided to a group of status lights 236 that visually indicate the status of the interrogated vehicle.

As previously mentioned, the OK DECISION network 238 also receives the output signal from TYPE MUX 220. The TYPE MUX 220 informs the OK DECISION network 238 whether the interrogator 14 being monitored is an entrance or exit interrogator. Since each interrogator 14 can only detect vehicles approaching from a single direction, it is necessary to provide a separate interrogator 14 at each entrance and exit of the parking facility. Accordingly, it follows that if an entrance interrogator detects a particular vehicle, the status of the vehicle in the memory unit 230 should be "out". Similarly, if an exit interrogator detects a vehicle, the status of the vehicle should be "in".

The OK DECISION network 238 checks the in/out status of the vehicle against the output signal from TYPE MUX 220 before providing an output signal to OK DEMUX 222 to open the appropriate gate 15. In this manner, the system prevents an individual from entering a parking facility, removing his transponder, and giving it to a friend in an unauthorized vehicle so that he may also enter the parking facility.

In addition, before providing an output signal to OK DEMUX 222, the OK DECISION network 238 also requires that the interrogated vehicle be properly leased. Thus, it can be seen that the interrogated vehicle must satisfy three conditions: its code must be a valid thousands, it must be properly leased, and its in/out status must compliment the interrogator type.

To maintain the proper in/out status of identified vehicles in the memory unit 230 of the controller 16, the status of a vehicle is automatically changed whenever it enters or exits the parking facility. Specifically, when an "OK" signal is provided by the decision network 238, a "write" signal is also generated that is supplied to the memory unit 230 to invert the in/out logic status of the identified vehicle. In other words, if a properly leased vehicle has just been permitted to enter the parking facility, the OK DECISION network 238 will automatically change the status of the vehicle in the memory unit 230 to "in". Similarly, if a properly leased vehicle has just been permitted to leave the parking facility, the OK DECISION network 238 will automatically change the status of the vehicle in the memory unit 230 to "out".

To manually program the in/out or leased/not leased status of a vehicle, a programmer memory access (PMA) circuit 226 is provided. The input to the PMA circuit 226 is connected to the output from the scan counter 224, and the output from the PMA circuit 226 is provided to a group of change status buttons 234. The programmer memory access 226 is adapted to enable the change status buttons 234 during the fourth 40 clock pulse period. However, to avoid the problem previously discussed of accessing the memory unit 230 before the desired information has been completely entered into address shift register 232, the PMA circuit 226 is further adapted to enable the change status buttons 234 only when a signal is provided from scan counter 224 on line 227. In other words, only during the latter half of the 40 clock pulse period when the output from the scan counter 224 is 1—1, will the PMA circuit 226 enable the change status buttons 234.

When enabled, the in/out and leased/not leased status changes entered on the change status buttons 234 are "written" into the memory unit 230 at the address location corresponding to the ten least significant bits in the address shift register 232. The memory address accessed during the PMA period is dependent upon the information provided on the fourth input line to DATA MUX 216, which corresponds to the information displayed on the video display 215.

For example, assume that the leased/not leased status of a vehicle identified by interrogator 14a is desired to be changed. To accomplish this, the manual interrogator select switch 199 is set to the first interrogator position thereby permitting the output from interrogator 14a to be provided to the display select multiplexer 201. The manual select button to the display MUX 201 is then set to "interrogator" to pass the information from the interrogator 14a selected by the rotary select switch 199. The output from the display select MUX 201 is provided to the fourth input terminal to DATA MUX 216 and also to an auto synchronous detection circuit 205. The auto synchronous detection circuit 205 is identical to the auto synchronous decoder 74 in the interrogator 14 previously described. The detection circuit 205 continuously examines the sequence of data received from the display select MUX 201 until the stereotype position of the encoded word is recognized. When this occurs, a sync pulse is provided on line 207 to the fourth input of SYNC MUX 218, and also on line 209 to the video display 215, in much the same manner as the sync pulses provided by interrogators 14a, 14b and 14c.

The address shift register, meanwhile, has also received the same sequence of data from the display select MUX 201 as the detection circuit 205, and therefore contains the same encoded word in its stereotype position when the sync pulse is provided by detection circuit 205. Assuming that the encoded word is a valid thousands, the ten lease significant bits of the encoded word become the address accessing memory unit 230. Accordingly, the leased/not leased status change entered on status buttons 234 will be programmed into the memory unit 230 at the accessed address.

In addition, when the sync signal on line 209 is received from the detection circuit 205, the display unit 215 visually displays the information from the display MUX 201. In this manner, the operator can visually check the identity of the vehicle whose status has been programmably changed.

Figure 13:
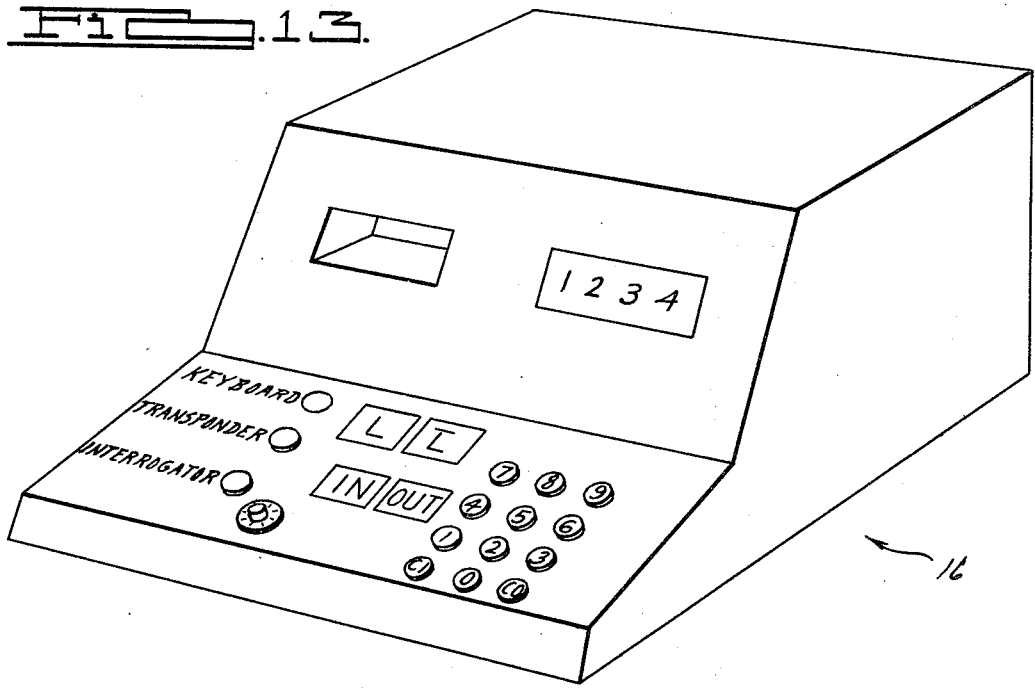
FIG. 13 is a pictorial view of the controller showing the front panel controls.

More frequently, however, it will be desirable to program the initial status of a new transponder 12. To accomplish this, the transponder 12 is inserted in the opening in the front panel of the controller 16 as illustrated in FIG. 13, and the number to be given the transponder 12 is entered through the keyboard circuit 185. The number entered via the keyboard circuit 185 is programmed into the transponder 12 by the transponder programmer 200. As will subsequently be described in greater detail, the transponder programmer 200 includes a "simplified" interrogator which optically clocks the transponder 12, detects the responsive sequence of transponder pulse representing the newly programmed information, and provides the information to the display select MUX 201 on line 203. With the select button to the display MUX 201 set to "transponder", the information from the programmed transponder 12 is provided to the fourth input to the DATA MUX 216 and to the auto synchronous detection circ 205. The transponder information is then decoded and displayed on the video display 215, and additionally supplied to the address shift register 232 where it determines the address accessing the memory unit 230 a previously explained. Upon generation of a sync pulse by the detection circuit 205, again assuming that the programmed word is a valid thousands, the information entered through the changed status buttons 234 will be programmed into the memory unit 230 at the address conta in the address shift register 232 and displayed on the video display unit 215. Additionally, to check that the proper status has been assigned to the programmed transponder, the satus changes entered in the memory unit 230 are displayed by the status lights 236, thereby provi a visual check of the programmed status changes.

To prevent unauthorized programming of a transponder 12, the controller 16 is preferably equipped with a key switch 242 connect in series between the keyboard circuit 185 and the transponder programmer 200. In this manner, any information entered via the keyboard circuit 185 while the key switch 242 is in the "off" position will have no effect on the transponder programmer 200. Similarly, to prevent unauthorized program changes in the status of a vehicle, the controller 16 is also preferably equipped with a key switch 244 which is installed in series between the programmer memory access circuit 226 and the change status buttons 234. In the "off" position, key switch 244 preve the PMA circuit 226 from enabling the change status buttons 234, there rendering the change status buttons 234 inoperative.

Finally, the controller 16 includes an anti pass-down disable circuit 239 that is connected to the OK DECISION network 238. The purpose of the anti pass-down disable circuit 239 is as follows. In the event of a power failure, it is possible that the entire memory 230 of the controller 16 could be destroyed. In such a situation, the in/out and leased/not leased conditions checked by the OK DECISION network 238 would invariably prevent authorized vehicles from entering and exiting the parking facility. To prevent his from occurring, the anti pass-down disable circuit 239 provides a signal to the OK DECISION network 238 in the event of a power failure which is effective to eliminate the leased/not leased and in/out checks. In other words, when the OK DECISION network 238 receives an output signal from the anti pass-down disable circuit 239, it amends its operation to pass any vehicle which is a valid thousands.

It is to be understood, that the controller 16 described above represents one of many embodiments which can be devised to process the information received from one or more interrogators. In general, the processing performed by the controller 16 depends upon the desires of the user and the end use to which the system is put. For example, the controller 16 could also be connected to a printer that records the numbers of the vehicles entering the parking facility. The compilation could then be used to prepare monthly billing statements. In addition, a timer could be employed in combination with the printer to record the amount of time that each vehicle spends inside the parking facility. This information could supplement the above compilation and provide the necessary information to prepare total hourly billing statements at the end of each month. Thus, the means for processing the data information produced by an interrogator 14 according to the present invention is not to be limited to the precise embodiment of the controller 16 described above.

Turning to FIG. 11a, a more detailed block diagram of the front panel control section 240 of the controller 16 is shown. The keyboard circuit 185 includes a keyboard 184 comprising a push button number matrix and the related circuitry required to generate the binary coded decimal representations of the numbers entered on the keyboard. The parallel output from the keyboard 184 is provided to a BCD-to-binary converter 186 which converts the binary coded decimal signals from the keyboard 184 to straight binary. The parallel binary output from converter 186 is provided to an audio synchronous coding circuit 188 which is hard-wired to add the proper coding restrictions to the 13-bit binary word. In other words, coding circuit 188 adds the appropriate five restrictive bits to the 13-bit binary word in the proper bit positions to produce the 18-bit encoded word that will be programmed into the transponder 12.

The serial output from the keyboard circuit 185 on line 189 is provided to one of the inputs to a multiplexer 202 and to the driver circuit 192 of the transponder programmer 200. As will be described in greater detail in connection with the description of FIG. 12, the driver circuit 192 amplifies the square wave signal from keyboard circuit 185 to a level suitable for loading into the transponder 12. The transponder 12 is adapted to plug into the opening in the front panel of the controller 16, illustrated in FIG. 13, so that load line 194 from driver circuit 192 connects to the PROGRAM IN terminal (pin 1) of transponder shift register 38, and line 196 connects to the ground terminal (pin 7) of the transponder shift register 38. When properly inserted into the front panel of the controller 16, the transponder 12 is positioned so that phototransistor 30 is in optical communication with the LED from the driver and LED circuit 190, and the emitter LED 42 of transponder 12 is in optical communication with the photodetector from the detector and processor circuit 194. The 18-bit encoded word is serially shifted into shift register 38 of the transponder 12 via load line 194 as the transponder 12 is optically clocked by the driver and LED circuit 190.

To insure that the proper encoded word has been programmed into the transponder 12, the driver and LED circuit 190 continues to optically clock the transponder 12 after the encoded word has been entered into the transponder shift register 38. In this manner, the newly programmed encoded word is optically emitted by the output LED 40 of the transponder 12. The infrared output signal from the transponder 12 is received by the detector and processor 194 which converts the optical signal to a corresponding digital square wave signal.

The serial output signal from the detector and processor circuit 194, representing the encoded word that was programmed into the transponder 12, is provided to a second input terminal of multiplexer 202. A third input to multiplexer 202 is connected to the rotary contact of a rotary switch 199. The various contact terminals of the rotary switch 199 are connected to the DATA OUT terminals of the various interrogators 14 monitored by the controller 16, as shown in FIG. 11. The multiplexer 202 is adapted to provide an output signal to the video display unit 215 corresponding to one of the signals on its three input lines in accordance with the selection entered via selector 198. As best illustrated in FIG. 13, selector 193 comprises a pair of push buttons labeled "interrogator" and "transponder", and a "keyboard" light that indicates activation of the keyboard which occurs automatically whenever any of the keyboard buttons is depressed. Each of the three states of selector 198 is adapted to provide a unique digital signal on the two select lines to multiplexer 202 that is effective to select one of the three input signals provided to multiplexer 202 for display on the video display unit 215. In addition, as previously described in connection with the description of FIG. 11, the number displayed on the display unit 215 also determines the address of the memory unit 230 accessed during the PMA period.

The serial output from multiplexer 202 is provided to the 18-bit shift register 204 of the auto-synchronous detection circuit 205. Eight parallel output lines from shift register 204, corresponding to bit positions, 1, 5, 8, 9, 10, 14, 17 and 18, are provided to an auto-synchronous decoder circuit 206 which is identical to the decoder 74 in interrogator 14, except that the controller decoder 206 does not perform a parity check. The decoder 206 continuously monitors the bit positions indicated until the stereotype position of the encoded word is recognized. When this occurs, the decoder 206 provides a sync pulse on line 207 to latch circuit 208 which is effective to parallel load the 13 information bits from shift register 204 into latch 208.

The decoded information from latch 208 is parallel fed to a binary-to-BCD converter 210 which converts the binary information to its binary coded decimal form. The converted information is then supplied to the drivers and display circuit 212 which simultaneously receives the sync pulse from decoder circuit 206 through a display gate 214, thereby enabling the drivers that activate the video display.

Thus, it can be seen that the number programmed into the transponder 12 can be visually displayed on display unit 215 as an immediate check of the accuracy of the programming operation. In addition, as previously explained, any number entered via the keyboard 184 is automatically displayed on the display unit 215 to provide a visual comparison with the number programmed into the transponder 12.

Finally, it will be noted that once a transponder 12 is programmed with a new number and the number is displayed on the display unit 215, the initial status to be assigned the transponder 12 can be programmed into the memory unit 230 of the controller 16 simply by entering the desired status on the change status buttons 234. As previously explained, the status assigned the transponder 12 will be immediately displayed on the status lights 236 located on the front panel of the controller 16, as shown in FIG. 13.

Figure 12:
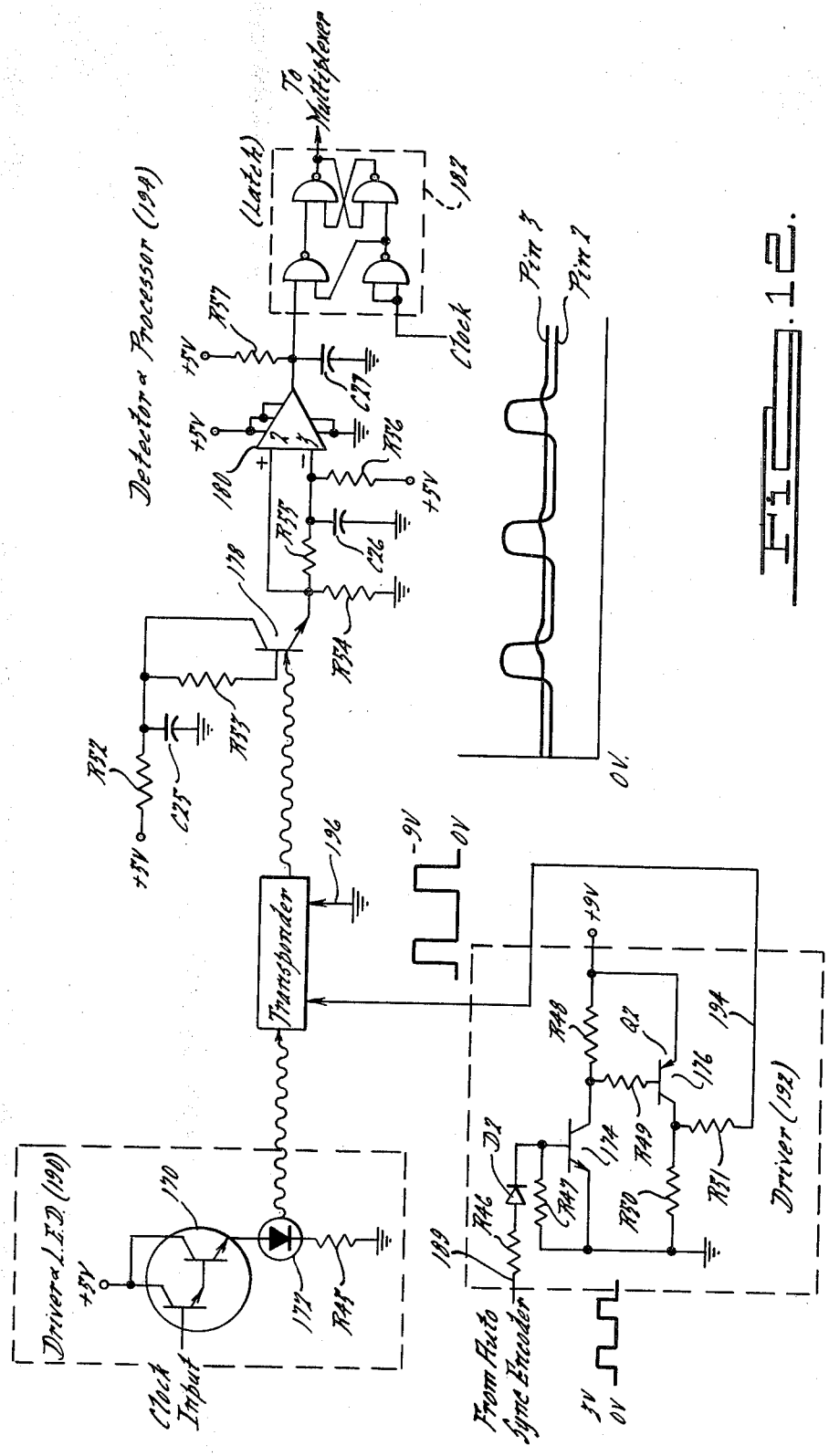

Turning now to FIG. 12, a circuit diagram of the transponder programmer 200 is shown. The driver circuit 192, which provides the encoded word on line 194 that is loaded into the transponder 12, is adapted to increase the voltage swing of the digital pulses received from the keyboard circuit 185. Specifically, the pulses provided at the output from keyboard circuit 185 have a voltage swing of approximately 0 to 3 volts, whereas the voltage swing of the digital pulses provided to the transponder 12 from the driver circuit 192 on output line 194 vary between 0 and 9 volts.

Driver circuit 192 comprises a pair of transistors 174 and 176. The output from keyboard circuit 185 on line 189 is provided to the base of transistor 174 through a resistor R46 and a diode D2. The emitter of transistor 174 is tied to ground and returned to its base through feedback resistor R47. The collector of transistor 174 is connected to the base of transistor 176 through a resistor R49 and to +9 volts through resistor R48. The emitter of transistor 176 is also connected to +9 volts, and its collector is tied to ground through pull-down resistor R50. The output from driver circuit 192, provided on line 194, is taken off the collector of transistor 176 through resistor R51.

When a LO signal is present on line 189, the lack of a positive bias voltage at the base of transistor 174 renders transistor 174 non-conductive. With transistor 174 turned off, a positive potential is present at the base of transistor 176, which renders transistor 176 non-conductive as well. Accordingly, a LO output signal is provided on output line 194. Conversely, when a HI signal is present on line 189, the positive potential at the base of transistor 174 renders transistor 174 conductive. With transistor 174 turned on, a direct current path is provided between +9 volts and ground, thereby supplying a negative potential at the base of transistor 176 due to the voltage drop across resistor R49. The negative potential at the base of transistor 176 renders transistor 176 conductive which, in turn, causes the output signal on line 194 to swing to 9 volts. Finally, when the signal on line 189 again goes LO, both transistors 174 and 176 are again rendered non-conductive, and the output potential on line 194 returns to zero. Thus, it can be seen that the magnitude of the voltage swing of the square wave digital pulses received from keyboard circuit 185 are effectively amplified by the driver circuit 192 for loading into the transponder 12.

The 18 bit encoded word is optically clocked into the shift register 38 of the transponder 12 by the LED and driver circuit 190. The driver and LED circuit 190 comprises a Darlington transistor pair 170 having its collector terminals connected to a bias +5 volts, and its base terminal connected to receive the clock signal from the system clock 225. The emitter output terminal of the Darlington pair 170 is connected to the cathode of an LED 172 which has its anode tied to ground through a resistor R45. Thus, for each clock pulse received at the base terminal of the Darlington pair 170, the LED 172 will emit a correlative infrared optical pulse.

The infrared pulses from LED 172 are detected by the phototransistor 30 of transponder 12 in the same manner as the sequence of interrogator pulse previously explained. As described in connection with the operation of the transponder 12, the optical pulses detected by phototransistor 30 are converted to digital clock pulses which are provided to the clock terminal (pin 3) of the shift register 38 shown in FIG. 7. The clock pulses are effective to circulate the shift register 38, thereby serially programming into shift register 38 the encoded word from driver circuit 192.

Once the 18 bit encoded word has been shifted into the shift register 38, the continued receipt of infrared clock pulses from LED 172 causes the transponder 12 to begin emitting infrared pulses correlative of the newly programmed encoded word. These infrared transponder pulses are detected and converted to correlative square wave digital pulses by the detector and processor circuit 194.

The detector and processor circuit 194 functions essentially as a "simplified" interrogator, and is seen to comprise a phototransistor 178 having its base terminal connected to a bias +5 volts through a pair of series resistors R52 and R53. The mid-point of the voltage divider network is connected to ground through a capacitor C25 and to the collector of phototransistor 178. The capacitor-resistor combination, R52 and C25, serves to eliminate any noise on the +5 volt supply line. The emitter of phototransistor 178 is connected directly to the positive input terminal (pin 2) of a comparator amplifier 180. Additionally, the emitter of the phototransistor 178 is connected through a filtering network, comprised of resistors R54 and R55 and capacitor C26, to the negative input terminal (pin 3) of the comparator amplifier 180. The filtering network essentially eliminates positive pulses from the output signal of phototransistor 178. Thus, it can be seen that the signal applied to the negative input terminal (pin 3) of comparator amplifier 180 constitutes a self-seeking threshold signal related to the d.c. bias level of the signal applied to the positive input terminal (pin 2) of comparator amplifier 180. The negative input (pin 3) of comparator amplifier 180 is also connected to a bias +5 volts potential through resistor R56 to insure that the threshold level of the signal applied to the negative input (pin 3) of comparator amplifier 180 is always slightly greater than d.c. bias level of the signal applied to the positive input (pin 2), as shown in the accompanying signal diagram.

Comparator amplifier 180 is adatped to provide a positive output signal whenever the signal at its positive input terminal (pin 2) is greater than the signal at its negative input terminal (pin 3). Thus, it can be seen that comparator amplifier 180 will provide an output signal whenever a positive pulse is present at its positive input terminal (pin 2), which will occur whenever an infrared optical pulse is detected by phototransistor 178.

The output from comparator amplifier 180 is provided to a latch circuit 182 identical to the latch 72 of interrogator 14. The input of latch 182 is also connected to a bias +5 volts through resistor R57 and to ground through capacitor C27 to insure that the output pulses from comparator amplifier 180 swing between 0 and 5 volts. Thus, latch circuit 182 insures that a sharp digital signal is provided to multiplexer 202 that is properly timed in relation to the system clock 225.

While the above description constitutes the preferred embodiments of the invention, it will be appreciated that the invention is suseptible to modification, variation and change without departing from the proper scope or fair meaning of the accompanying claims.

What is claimed is:

1. In a transponder/responder system wherein said transponder is battery operated and is adapted to emit a transponder signal in response to the receipt of a remote enabling signal;
   a responder including means for generating a timing signal, means responsive to said timing signal for generating said remote enabling signal, means for receiving said transponder signal, and means for remotely checking the condition of said battery by temporally comparing the time of receipt of said transponder signal relative to said timing signal.

2. The system of claim 1 wherein the output voltage of said battery diminishes as the condition of said battery declines.

3. The transponder/responder system of claim 1 wherein said transponder includes infrared transmitting means for transmitting an infrared transponder signal and said responder includes infrared detecting means for receiving said infrared transponder signal.

4. The transponder/responder system of claim 1 wherein said system is a synchronous system in that said responder is adapted to produce a remote enabling signal comprising a pulse signal having a predetermined frequency and said transponder is adapted to transmit a digital output signal in response to said remote enabling signal such that one bit of said digital output signal is emitted in response to the receipt of each pulse of said remote enabling signal.

5. The transponder/responder system of claim 4 wherein said transponder includes delay means for delaying for a predetermined time period the transmission of each bit of said digital output signal relative to the receipt of each pulse of said remote enabling signal.

6. The transponder/responder system of claim 5 wherein said predetermined time delay varies with the voltage output of said battery.

* * * * *